United States Patent [19]
Marinelli

[11] Patent Number: 6,157,898
[45] Date of Patent: *Dec. 5, 2000

[54] SPEED, SPIN RATE, AND CURVE MEASURING DEVICE USING MULTIPLE SENSOR TYPES

[75] Inventor: David J. Marinelli, Superior, Colo.

[73] Assignee: Silicon Pie, Inc., Superior, Colo.

[*] Notice: This patent is subject to a terminal disclaimer.

[21] Appl. No.: 09/346,003

[22] Filed: Jul. 1, 1999

Related U.S. Application Data

[63] Continuation-in-part of application No. 09/007,241, Jan. 14, 1998.

[51] Int. Cl.[7] .................................................. G06F 15/00
[52] U.S. Cl. ..................... 702/141; 702/142; 702/149; 702/150; 473/569
[58] Field of Search ..................... 702/141, 142, 702/149, 150; 473/569; 368/250, 255

[56] References Cited

U.S. PATENT DOCUMENTS

| | | |
|---|---|---|
| 4,775,948 | 10/1988 | Dial et al. . |
| 5,526,326 | 6/1996 | Fekete et al. . |
| 5,564,698 | 10/1996 | Honey et al. . |
| 5,592,401 | 1/1997 | Kramer . |
| 5,761,096 | 6/1998 | Zakutin . |
| 5,779,576 | 7/1998 | Smith, III et al. . |

*Primary Examiner*—Marc S. Hoff
*Assistant Examiner*—Hien Vo
*Attorney, Agent, or Firm*—James R. Young

[57] ABSTRACT

A device for measuring a movable object, such as a baseball, football, hockey puck, soccer ball, tennis ball, bowling ball, or a golf ball. Part of the device, called the object unit, is embedded, secured, or attached to the movable object of interest, and consists of an accelerometer network, electronic processor circuit, and a radio transmitter. The other part of the device, called the monitor unit, is held or worn by the user and serves as the user interface for the device. The monitor unit has a radio receiver, a processor, an input keypad, and an output display that shows the various measured motion characteristics of the movable object, such as the distance, time of flight, speed, trajectory height, spin rate, or curve of the movable object, and allows the user to input data to the device.

64 Claims, 29 Drawing Sheets

SPEED, SPIN RATE, AND CURVE MEASURING DEVICE USING MULTIPLE SENSOR TYPES

CROSS REFERENCE TO RELATED APPLICATIONS

This application is a continuation-in-part of application Ser. No. 09/007,241 of Dave Marinelli filed on Jan. 14, 1998 entitled A Speed, Spin Rate, and Curve Measuring Device.

FIELD OF THE INVENTION

This invention relates to measuring motion characteristics of movable objects and more particularly to measuring the speed, spin rate, and curve of a movable object. Even more particularly, the invention relates to measuring the speed, spin rate, and curve of a sporting device, such as a baseball, bowling ball, football, hockey puck, soccer ball, tennis ball, or golf ball by utilizing an embedded, secured, or attached object unit and an external monitor unit.

BACKGROUND OF THE INVENTION

Participants of many sports, including baseball, football, soccer, hockey, tennis, and golf, and their coaches, are often interested in knowing the motion characteristics of the object used in a sport, such as the distance, time of flight, speed, height, spin rate, or curve of thrown, kicked, or batted balls and slapped hockey pucks. Typically, the speed of a moving ball is measured using a Doppler radar system. Doppler radar systems determine a moving ball's speed by analyzing radar beams reflected off the ball. Although accurate, these systems are expensive and normally cannot be operated by the athlete whose toss or hit is being measured. For these reasons, systems of this type are generally restricted to organized sport teams. Also, Doppler radar systems are not able to measure the spin rate of the ball of interest or give information about the orientation of surface features of the ball, such as leather seams, finger holes, etc., with respect to the axis of rotation. Spin rate and axis of rotation information is useful for example in optimizing a baseball pitcher's curve ball pitching ability.

Several other methods for measuring the motion characteristics of moving objects have been proposed over the years that rely on devices wholly external to the moving object. Another approach to the problem involves placing a measurement device within the moving object. Four such systems are described in U.S. Pat. No. 4,775,948 issued on Oct. 4, 1988 to Dial et al. entitled "Baseball Having Inherent Speed-Measuring Capabilities", the '948 patent, U.S. Pat. No. 5,526,326 issued on Jun. 11, 1996 to Fekete et al. entitled "Speed Indicating Ball", the '326 patent, U.S. Pat. No. 5,761,096 issued on Jun. 2, 1998 to Zakutin entitled "Speed Sensing Projectile", the '096 patent, and U.S. Pat. No. 5,779,576 issued on Jul. 14, 1998 to Smith, III et al. entitled "Throw Measuring Football", the '576 patent.

The '948 patent involves placing an electronic timer and calculator within the ball. The timer measures the ball's time of flight over a measured distance, and on that basis determines the ball's speed. It then displays the speed on the surface of the ball via a liquid crystal display. The '326 patent suggests that a more economical and durable method of accomplishing the same task is met by using mechanical means internal to a ball for determining time of flight and speed. The '096 patent discloses a projectile, such as a baseball, having an inertial switch that opens and closes in response to linear accelerations. An electronic processor connected to the inertial switch calculates speed and displays the results on a visual display on the surface of the ball. The '576 patent discloses an accelerometer in cooperation with a microprocessor within a projectile, such as a football. A liquid crystal display on the surface of the football allows flight characteristics calculated by the microprocessor to be displayed.

None of these systems previously proposed, however, combine the desirable characteristics of being economical, durable, simple to operate by the athlete, and transparent to that athlete in terms of the feel and use of the ball. Also, none of the systems proposed are able to measure the ball's spin rate, curve, or axis of rotation. The embedded electronic timer with a liquid crystal display proposed in the '948, '096, and '576 patents are vulnerable to strikes against the ground, a glove, or a bat. The mechanical solution proposed in the '326 patent claims to be more durable, but alters a ball's physical characteristics even more because of its voluminous design. In addition, it splits a ball into two halves that must be wound relative to each other by the player. The two halves must be held in this position until released in a toss. This design is not transparent to the user and alters the physical structure, balance, and flight performance of a ball significantly. Also, the mechanical design cannot be applied to moving objects that are not held by a player, such as a hockey puck.

It is thus apparent that there is a need in the art for an improved measuring method or apparatus which does not significantly or materially alter the moving object in question's physical characteristics or flight performance, is inexpensive, durable, applicable to many different types of sports equipment and other movable objects, measures many different motion characteristics, and is operable by the person doing the throwing, kicking, hitting, or batting. The present invention meets these and other needs in the art.

This application is a continuation-in-part of application Ser. No. 09/007,241 of Dave Marinelli filed on Jan. 14, 1998 entitled A Speed, Spin Rate, and Curve Measuring Device, which is incorporated herein by reference for all that is disclosed and taught therein.

The present invention improves upon of application Ser. No. 09/007,241 of Dave Marinelli by describing methods of:

(1) reducing the number of g-force proportional sensors required to measure the spin rate of a rotating object through the use of a mixture of mechanical switches and g-force proportional sensors;

(2) reducing the battery power consumed by g-force proportional sensors used to measure the spin rate of a rotating object through the use of a mixture of mechanical switches and g-force proportional sensors. The mechanical switches detect spin. When spin is detected, the g-force sensors are turned on to measure the centrifugal force, from which spin rate and curve can be calculated, and are then turned off.

(3) reducing the number of g-force proportional sensors required to measure flight time and spin rate through the use of new filtering algorithms;

(4) improving the usability of sporting goods projectiles by transmitting motion data immediately after launch;

(5) improving the usability and manufacturability of moving object and monitor pairs by way of an improved identification code mating scheme; and (6) improving the usability of collected moving object motion data by providing for a means to transfer the motion data to an external computer system for analysis;

(7) providing the user of a spinning object, such as a baseball, information about the orientation of the axis of rotation with respect to markings on the ball such as the leather seams.

SUMMARY OF THE INVENTION

It is an aspect of the present invention to measure the distance, time of flight, speed, trajectory height, spin rate, or curve of a movable object utilizing an attached object unit in the movable object.

It is another aspect of the invention to utilize an attached object unit in the movable object that emits radio signals and an external monitoring unit that receives radio signals to measure the distance, time of flight, speed, trajectory height, spin rate, or curve of a movable object.

It is another aspect of the invention to utilize modulated radio frequencies with an identification code to minimize interference.

Yet another aspect of the invention is to be able to measure a plurality of movable objects with a plurality of attached object units and at least one monitor unit.

Still another aspect of the invention is to utilize acceleration sensors arranged in an acceleration sensor network to detect spin of a movable object.

A further aspect of the invention is to utilize acceleration sensors arranged in an acceleration sensor network to measure the centrifugal g-forces of a spinning movable object.

A still further aspect of the invention is to measure motion characteristics of a movable object in such a way as to not significantly alter the physical characteristics and flight performance of the movable object being measured.

A further aspect of the invention is to utilize the acceleration sensor network to determine the orientation of the axis of rotation with respect to the sensor network or visible markings on the moving object.

Another further aspect of the invention is to send motion data from the movable object to the monitor unit by having the object unit reflect and modulate a radio signal generated by the monitor unit (a technique known as modulated backscatter).

The above and other aspects of the invention are accomplished in a device for measuring the motion characteristics, such as distance, time of flight, speed, trajectory height, spin rate, or curve, of a movable object. One type of movable object is a sporting device, such as a baseball, football, hockey puck, soccer ball, tennis ball, bowling ball, or golf ball. Part of the device, called the object unit (also referred to as the projectile unit), is embedded, secured, or attached to the movable object of interest. The other part of the device, called the monitor unit (also referred to as the receiving unit), may also be embedded, secured, or attached to the movable object of interest, wherein the object unit and the monitor unit are hardwired together. However, in the preferred embodiment of the invention, the monitor unit is external to the object unit embedded within the movable object, and the object unit and the monitor unit communicate with each other through radio signals or other telecommunication link. The monitor unit is held or worn by the user and serves as the user interface for the device. The monitor unit displays the various measured motion characteristics of the movable object and allows the user to input data to the device.

The object unit has an acceleration sensor network, electronic processor circuit, battery, and, in the preferred embodiment, a radio transmitter that can be wholly and invisibly embedded, secured, or attached in the center of a substantially solid movable object, such as a baseball, golf ball, or hockey puck, or attached or suspended inside a deformable movable object, such as a football, soccer ball, or tennis ball. Its size and construction can yield a baseball, football, hockey puck, soccer ball, tennis ball, or golf ball that looks, feels, and flies as normal baseballs, footballs, hockey pucks, soccer balls, tennis balls, or golf balls.

The monitor unit has a processor, an output display, a keypad for user input, and in the preferred embodiment of the invention, a radio receiver. It provides a readout of distance, time of flight, speed, trajectory height, spin rate; or curve of a movable object. The monitor unit may be constructed similar to a wristwatch, stopwatch, or a pocket sized calculator for portability, and can provide visual or audio readouts. It could also support the transfer of accumulated projectile statistics to an external system such as a personal computer via wired or wireless communication channels. The personal computer would facilitate analysis of the accumulated statistics.

In another embodiment the object unit has a passive radio transmitter and the monitor unit has a radio transmitter/receiver that emits a continuous radio frequency sine wave. The passive transmitter is powered by the electromagnetic energy in the monitor unit's transmissions. The object unit reflects back the monitor unit's transmissions and modulates the signal with elapsed time, g-force data, and identification code data, etc. This technique, referred to as modulated backscatter, is commonly used with Radio Frequency Identification (RFID) devices. Although the monitor unit's design complexity is increased using this technique, the object unit's transmitter design is simplified and uses little internal energy.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
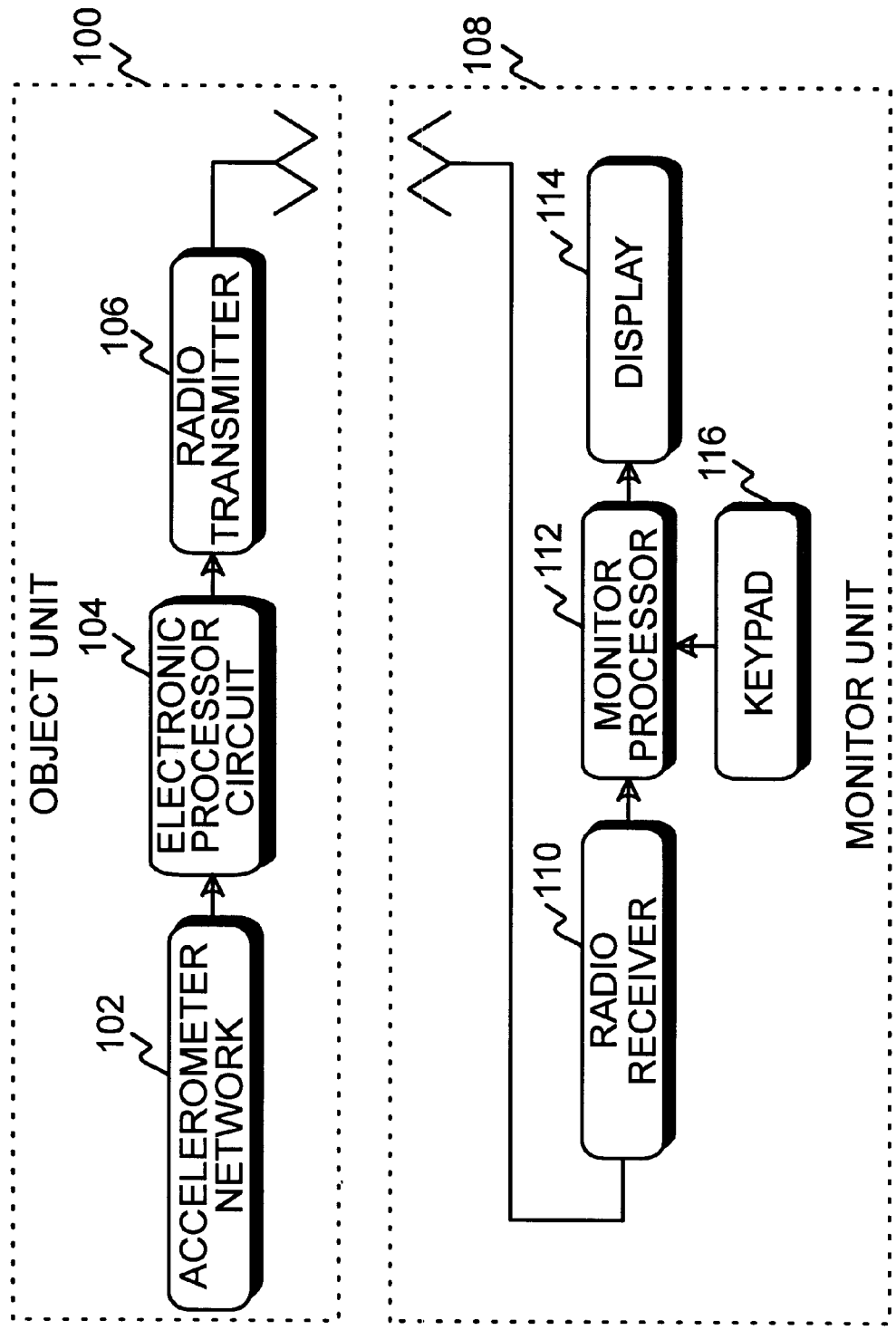
FIG. 1 shows a block diagram of a device for measuring the speed, spin rate, and curve of a movable object of the present invention.

FIG. 1 shows a block diagram of a device for measuring the speed, spin rate, and curve of a movable object of the present invention. Referring now to FIG. 1, the invention comprises two main parts: object unit 100 and monitor unit 108. The intent of the invention is to provide the user with statistics about the trajectory of a spinning movable object. Object unit 100 has an acceleration sensor network 102 that communicates through electronic processor circuit 104 to monitor unit 108, which may be hardwired to electronic processor circuit 104. In the preferred embodiment of the invention as depicted in FIG. 1, object unit 100 is embedded within the movable object, and monitor unit 108 is external to object unit 100. Object unit 100 and the monitor unit 108 communicate with each other through radio signals. In the preferred embodiment of the invention, radio transmitter 106 within object unit 100 is connected to electronic processor circuit 104. In an embodiment where monitor unit 108 is not external to object unit 100, radio transmitter 106 is eliminated from object unit 100.

Object unit 100 is powered by a battery (not shown in FIG. 1). Acceleration sensor network 102, embedded along with the other components of object unit 100 within or attached to a movable object, detects centrifugal force, that is, acceleration generated by rotation about an axis.

Since the electronics embedded, secured, or attached within object unit 100 are not accessible to the user, battery conservation is paramount. For a baseball there can be no physically accessible switch to turn the unit on or off as this would compromise the physical attributes of the baseball. Aside from employing low power design techniques and components, four strategies may be used to facilitate a long useful life for the embedded electronics.

1. Usage Detector With Auto-Shutoff—For a baseball, for example, it is possible to detect usage by way of motion. Motion sensing may be done using the same acceleration detectors used to detect pitches or, if useful for further energy conservation, a different type of sensor such as a mechanical on/off switch that is triggered by motion could be used. Once triggered, the circuit will remain 'alive' in a higher energy usage state for a predetermined period of time, say one minute, unless motion is again detected before the minute expires, in which case the circuit is alive again for another minute.
2. RF Remote Control On Switch With Auto-Shutoff—The object unit would contain an RF receiver as well as a transmitter. The monitor unit would contain an RF transmitter as well as a receiver. When the user presses a "TURN ON BALL" button on the monitor unit (not shown in FIG. 2), an RF signal is sent to the object unit that turns on the object unit's internal electronics. Once on, the circuit would remain on as long as motion was detected within a specific interval, such as one minute. If one minute passes without detecting motion, the circuit would shut itself off and could only be re-awakened by the user pressing the "TURN ON BALL" button again.
3. Magnetically Coupled Switch With Auto-Shutoff— Application of an external magnet to a specific spot on the surface of a baseball, for example, would trigger a magnetically sensitive switch that would activate the internal electronics. Once on, the circuit would remain on as long as motion was detected within a specific interval, such as one minute. If one minute passes without detecting motion, the circuit would shut itself off and could only be re-awakened by application of the magnet.
4. Inductively Coupled Charging Circuit—An internal rechargeable battery could be charged by transferring energy inductively from a coil external to the object unit to a receiving coil internal to the object unit. This implies that an inductive charging unit is provided with the invention and that the object unit must occasionally be placed in the inductive charger.

Monitor unit 108 in the preferred embodiment of the invention as depicted in FIG. 1 has a radio receiver 110 that communicates with a monitor processor 112. An input keypad 116 inputs information to monitor processor 112, and monitor processor 112 sends information to an output display 114. Object unit 100 communicates with monitor unit 108 through radio transmitter 106 and radio receiver 110. In the embodiment where monitor unit 108 is not external to object unit 100, display 114 is connected to electronic processor circuit 104, and radio receiver 110, monitor processor 112, and input keypad 116 are eliminated.

The detection of centrifugal force is essentially the detection of spin. For example, baseballs and footballs spin when tossed and generally do not spin otherwise. Therefore, if monitor unit 108 is programmed by the user with the distance of a ball's toss, which can be entered by the user with keypad 116, monitor unit 108 can calculate the ball's speed if the ball transmits to monitor unit 108 its spin time, since spin time equals time of flight.

The g-forces experienced internal to a spinning ball are proportional to the square of the ball's spin rate. Since the acceleration sensors of acceleration sensor network 102 and electronic processor circuit 104 are able to measure the magnitude of the centrifugal forces, the spin rate can be deduced. Transmitting the g-force or spin rate information from radio transmitter 106 to radio receiver 110 of monitor unit 108, along with the spin time datum (the amount of time that the ball was spinning) allows monitor processor 112 to calculate not only the speed and spin rate of a toss, but also the calculated potential for the ball to 'curve'. The results are shown in display 114. In all embodiments of the invention, the term g-force data may refer to a digitized voltage signal from a centrifugal g-force sensor, a centrifugal g-force value or any value derived from processing a centrifugal g-force signal or value, such as spin rate or curve. In all embodiments of the invention, the term motion data, flight characteristics, or motion characteristics may include start of spin time, stop of spin time, elapsed spin time, speed, trajectory height, or g-force data.

If the axis of rotation of the ball is perfectly perpendicular to the ground plane, the total 'curve potential' can be realized. However, if the axis is parallel to the ground plane, the ball might not have any lateral deflection at all. In fact, with the proper orientation, the spinning may cause the ball to resist or accentuate the natural curve of a ball downward toward the ground due to gravity.

Monitor unit 108 can use the distance, speed, and spin rate information to estimate the potential for lateral deflection. In certain embodiments, the monitor may also have barometric pressure and hygrometer (humidity meter) devices and a gyroscope, or some other gravity vector detection device. To more accurately calculate and describe the lateral deflection (which may be expressed in inches or centimeters of curve of the ball away from a straight line trajectory) monitor unit 108 incorporates gravity vector information along with barometric pressure and humidity information about the ambient air.

Acceleration sensor network 102 may contain accelerometers of one or more of the following types: piezoelectric, mechanical, micro-machined silicon chip, or any other type small enough to be embedded, secured, or attached in a movable object. It may be advantageous to use two different types of sensors. For example, in a baseball a mechanical sensor might be used to detect 'use' of the ball to activate electronic processor circuit 104, whereas micro-machined silicon sensors might be used to detect spin events associated with the tosses to be measured. In this example, the mechanical switch provides the advantage of requiring zero power for its operation. The silicon sensors, unlike a mechanical on/off switch sensor, can provide an output proportional to the acceleration force.

Monitor unit 108 can be used to provide information other than distance, velocity, spin rate, or curve. It can provide time of flight, or elapsed time, and trajectory height information as well. In fact, these two trajectory statistics are independent of the horizontal distance traversed by the movable object containing object unit 100. Time of flight is simply obtained by measuring the amount of time between the start and end of spin of the movable object. This raw data is used in the velocity calculation. Provided that the launch altitude is equivalent to the landing altitude (or reasonably so with respect to the trajectory height) the movable object trajectory's maximum altitude can be calculated by monitor unit 108 and displayed to the user.

The equation that describes the vertical distance covered by a falling object is given below:

$$d=(\tfrac{1}{2})at^2$$

where:

d=distance covered by the falling object (in inches)

a=acceleration due to gravity (32.2 feet/sec$^2$)

t=flight time—from the moment the object was released to the moment it hits the ground (in seconds)

It is also generally true that the fall time of an object that is catapulted is equal to its rise time. That is, the time it takes for a football to reach its maximum vertical height in a punt is equal to the time it takes for the ball to fall back to the ground, provided that the ball is received on the same stationary plane from which it was kicked, roughly about four feet off the ground. Hence, the vertical height h of a punted football with total air time $t_a$ is given by the following equation:

$$h=(\tfrac{1}{8})at_a^2$$

Key to this invention are the following concepts:

1. arranging the sensor devices of acceleration sensor network 102 in a specific pattern within a movable object, such as a baseball, to sense the movable object's spin motion;
2. applying specific methods to the output of acceleration sensor network 102 through the use of electronic processor circuit 104 to determine whether to transmit information to external monitor unit 108 and what information should be transmitted;
3. transmitting specific information about sensor measurements to an external or attached monitor unit 108;
4. having monitor unit 108 use the motion data received via radio transmissions or a wired connection and data input by the user via keypad 116 to derive new trajectory statistics; and
5. showing the raw and calculated trajectory statistics on display 114.

The sensors making up acceleration sensor network 102 are arranged to detect spinning of the movable object about one or more internal axes. Object unit 100 signals the commencement of spinning and the cessation of spinning, or it signals the measured elapsed time between these two events to radio receiver 110 of monitor unit 108 via radio transmitter 106. Monitor unit 108 assumes that the spinning of the movable object containing object unit 100 occurs only as the result of being in flight and calculates the speed of the movable object by dividing the distance covered by the movable object by the time of flight. The distance covered by the movable object may be entered into monitor unit 108 via keypad 116 by the user.

Some types of sensors of acceleration sensor network 102 would be capable of measuring the centrifugal force generated by the movable object's spin. The measured centrifugal g-force experienced by these sensors while the ball is spinning may also be transmitted to monitor unit 108. Object unit 100 or monitor unit 108, knowing the distance of the sensors from the axes of rotation, can calculate the spin rate R of the movable object using the following equation:

$$R=\sqrt{g/1.226r}$$

where:

R=revolutions/second g=centrifugal g-force, 1g=32.3 ft/sec$^2$ r=radial distance from axis of rotation to sensor in feet Multiple sensors should be employed in order to most accurately measure centrifugal force due to rotation, if that rotation can occur along an infinite number of axes through the center of a moving object, such as a baseball. For a system having three centrifugal force sensors, sensing along three orthogonal axes, most likely none of the three will perfectly align with the true centrifugal force vector which lies in a plane orthogonal to the axis of rotation. Hence, measurements from all three sensors should be used along with trigonometric relationships to derive the true centrifugal force. These calculations can be performed in either object unit 100 or monitor unit 108.

The electronic processor circuit or the monitor processor may apply an adjustment factor to the measured elapsed time based upon the application. For example, in a baseball pitch, the point at which a spin event is detected in the windup and release of the baseball will affect the speed calculation. Simultaneous testing of the device with a Doppler radar system can be used to determine whether an adjustment for time, either adding or subtracting a few milliseconds, is necessary for the device to accurately calculate and display the speed of the baseball.

Also, adjustment factors may be applied to the average speed to display an estimate of the peak velocity of a ball (the initial velocity when the ball left the pitcher's hand), or the minimum velocity (the final velocity when the ball is caught). A tossed ball loses speed as it travels due to air resistance. The amount of speed loss varies for different average speeds. For a pitch having an average speed of ninety miles per hour, a good approximation is one mile per hour loss in speed per seven feet traveled. Hence, the peak and minimum velocities of a pitched baseball can be estimated by the following equations:

Peak Velocity $$V_p=V_a+0.5(d/l)$$

Minimum Velocity $$V_m=V_a-0.5(d/l)$$

where:

$V_p$=peak velocity in miles per hour $V_m$=minimum velocity in miles per hour $V_a$=average velocity in miles per hour d=distance covered in flight in feet l=velocity loss due to air resistance in feet/miles per hour The value of l depends upon the type of ball and the average speed of a pitch. The monitor processor will select a value of l using a lookup table or a mathematical calculation. For a baseball thrown at an average speed of 90 MPH over a distance of 60 feet, l is 7 and $V_m$ is calculated as shown below:

$$V_m=90-0.5(60/7)=86 \text{ MPH}$$

This calculation yields a speed that better matches the reading of an accurate Doppler radar that displays the velocity of a pitch as it crosses home plate. For whatever speed is calculated—average, peak, or minimum—the monitor updates the speed and flight time and spin rate displays only if the calculated speed is of a reasonable value for the given application. In the baseball pitching application, the display is updated if the calculated speed is between 20 and 100 MPH, for example.

A solid core is found at the heart of each regulation baseball or softball. Also, a hockey puck consists of a solid hard rubber material. Ideally, object unit 100 will be embedded in a core material that matches the weight characteristics of the regulation core. An epoxy resin might be used. It is important to position and orient acceleration sensor network 102 in the center of a ball.

The antenna for radio transmitter 106 should be fully contained within the movable object. The final product must be impervious to summer heat, winter cold, and the tremendous g-forces resulting from fast pitches, kicks, hockey slap shots, bats, or hits. Another challenge is to maintain the symmetrical balance of a ball or puck. Embedding object unit 100 within a deformable movable object such as a football or soccer ball is more difficult unless the ball has a foam core and is just a facsimile of a real ball. In an air-filled ball the object unit could be suspended in the center using strings or fabric webbing or other suitable means.

When acceleration sensor network 102 detects a spin event, it stimulates radio transmitter 106 to transmit signals conveying the duration of the spin event to monitor unit 108, which is external to object unit 100. Monitor processor 112 could calculate the speed of a baseball pitch using two pieces of information: 1) the duration of the spin event, and 2) the distance between the pitcher and the catcher. The distance between the pitcher and the catcher may be provided by the user to monitor processor 112 via manual entry through input keypad 116 or, alternatively, using a remote distance measuring device such as an ultrasonic based measure (not shown in FIG. 1). After each event, monitor unit 108 may display the calculated speed in output display 114.

Figure 2:
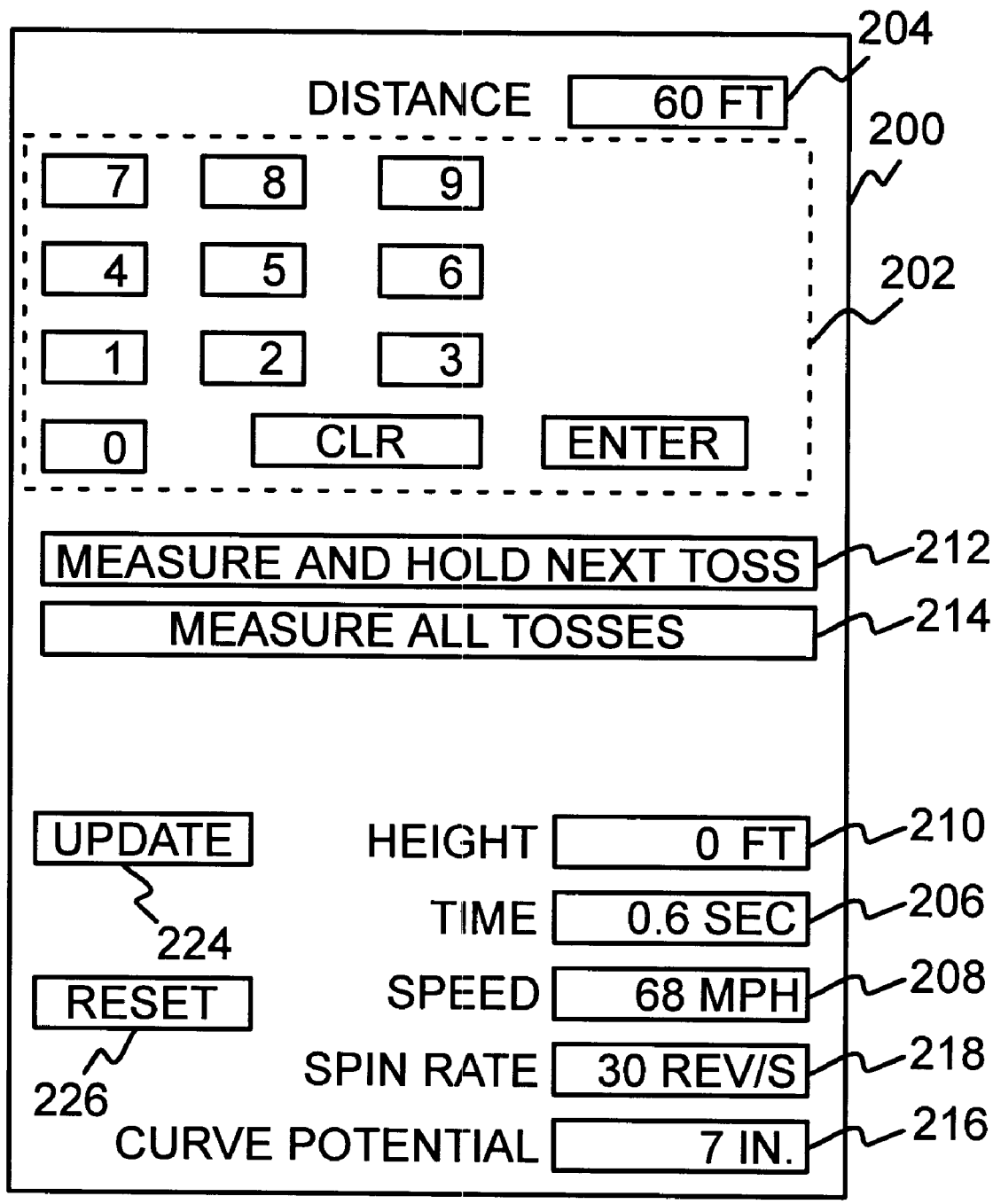
FIG. 2 shows an embodiment of the face of the monitor unit of the present invention.

FIG. 2 shows an embodiment of the face of the monitor unit of the present invention. Referring now to FIG. 2, face 200 of monitor unit 108 (FIG. 1) has numeric keypad 202 where the user may input information, such as the distance between a pitcher and a catcher. There are six displays. Distance display 204 shows the distance between two points, such as a pitcher and a catcher, that has been entered through numeric keypad 202. Time display 206 shows the time of flight of a movable object as calculated by monitor processor 112 (FIG. 1). Speed display 208 shows the speed of a movable object as calculated by monitor processor 112. Height display 210 shows the height of a movable object, such as a batted baseball or punted football, as calculated by monitor processor 112. Spin rate display 218 shows the revolutions per second of a movable object, such as a pitched baseball or thrown football, as calculated by monitor processor 112. Curve display 216 shows the potential lateral deflection in inches of a movable object, such as a pitched baseball, as calculated by monitor processor 112.

Measure and hold next toss button 212 is used to select the measure and hold next toss capability. To measure the speed of a pitched baseball using this capability, the pitcher or catcher would perform the following operations:
1. Throw a warm-up pitch to activate the embedded electronics (assuming that a motion based activation system is used).
2. Enter the distance in feet between the pitcher and catcher using numeric keypad 202.
3. Deliver the ball to the pitcher.
4. Press measure and hold next toss button 212.
5. Pitch and catch the ball.
6. Look at the displayed speed. There is no need to avoid spinning the ball in this mode as further spin events will be ignored and the speed for the pitch of interest is captured and held until one of the option buttons is pressed again. This mode allows a pitcher to throw the ball against a wall and have it bounce and roll on the ground, creating additional spin events, and still retain the speed statistic for the pitch.
7. Continue repeating steps 4 through 6 as desired.

In this mode of operation, the elapsed time between the two spin event markers received following depression of measure and hold next toss button 212 is used in the speed calculation.

Subsequent spin events will not affect the displayed speed statistic.

To measure the spin rate of a kicked soccer ball using the measure and hold next toss button 212 capability, the soccer player would perform the following operations:
1. The user sets the soccer ball containing object unit 100 down on the ground.
2. The user enters the distance from the ball to the net or wall he is kicking toward.
3. The user primes monitor unit 108 to receive the next transmission from the soccer ball by pressing measure and hold next toss button 212 on the monitor.
4. The user kicks the soccer ball.
5. Acceleration sensor network 102 with g-force proportional output sensors detects a start spin event, and transmits the measured centrifugal g-force data or calculated spin rate immediately.
6. Monitor unit 108 receives the g-force data or spin rate, calculates the spin rate (if necessary), displays the spin rate, and ignores all further g-force data or spin rate transmissions until primed again.
7. The soccer ball strikes the net and stops spinning momentarily.
8. Acceleration sensor network 102 detects a stop spin event, and transmits elapsed flight time data.
9. Monitor unit 108 receives the motion data transmission, calculates speed, displays the speed, and ignores all further motion data transmissions until primed again.
10. Continue repeating steps 1 through 8 as desired.

This mode of operation is also applicable to other moving objects, such as golf balls, footballs, hockey pucks, etc.

Measure all tosses button 214 is used to select the measure all tosses capability. To measure the speed of a pitched baseball using this capability, the pitcher or catcher would perform the following operations:
1. Throw a warm-up pitch to activate the embedded electronics (assuming that a motion based activation system is used).
2. Enter the distance in feet between the pitcher and catcher using numeric keypad 202.
3. Press measure all tosses button 214.
4. Deliver the ball to the pitcher.
5. Pitch and catch the ball.
6. Look at the displayed speed in speed display 208 before spinning the ball again.
7. Continue repeating steps 5 through 6 as desired.

In this mode of operation, monitor processor 112 calculates a new value for display in speed display 208 each time a spin event marker is received from the ball. The speed is calculated simply by dividing the distance value that was entered by the time that has elapsed since the last spin event marker was registered. Therefore, if after the pitch is caught, the ball is dropped by the catcher, the displayed speed will be in error if the dropping of the ball resulted in a valid spin event.

Although most pitching rubbers are placed a regulation distance from home plate, sometimes the distance must actually be measured prior to use of the invention to assure accurate results. In one embodiment of the invention, this measurement can be facilitated by placing an ultrasonic wave transmitter/receiver within monitor unit 108 that communicates with monitor processor 112, and locating the monitor unit at the measuring start or end point of interest. Whenever the measure button (not shown in FIG. 2) is pressed on the monitor unit, the distance measured from the start point to the end point will appear in distance display 204 and will subsequently be used in the speed calculations. For example, the catcher may have monitor unit 108 with the ultrasonic wave transmitter. The catcher would aim the ultrasonic wave transmitter at the pitcher, press the measure button, and the distance between the catcher and pitcher will appear in distance display 204. Alternatively, a separate ultrasonic wave transmitter with its own readout could be used, and the distance manually entered via numeric keypad 202.

For the embodiment of the invention that utilizes a modulated backscatter radio transmission technique, pressing update button 224 initiates a poll of the object unit by the monitor unit to obtain motion data being held by the object unit about the movable object itself.

Figure 11A:
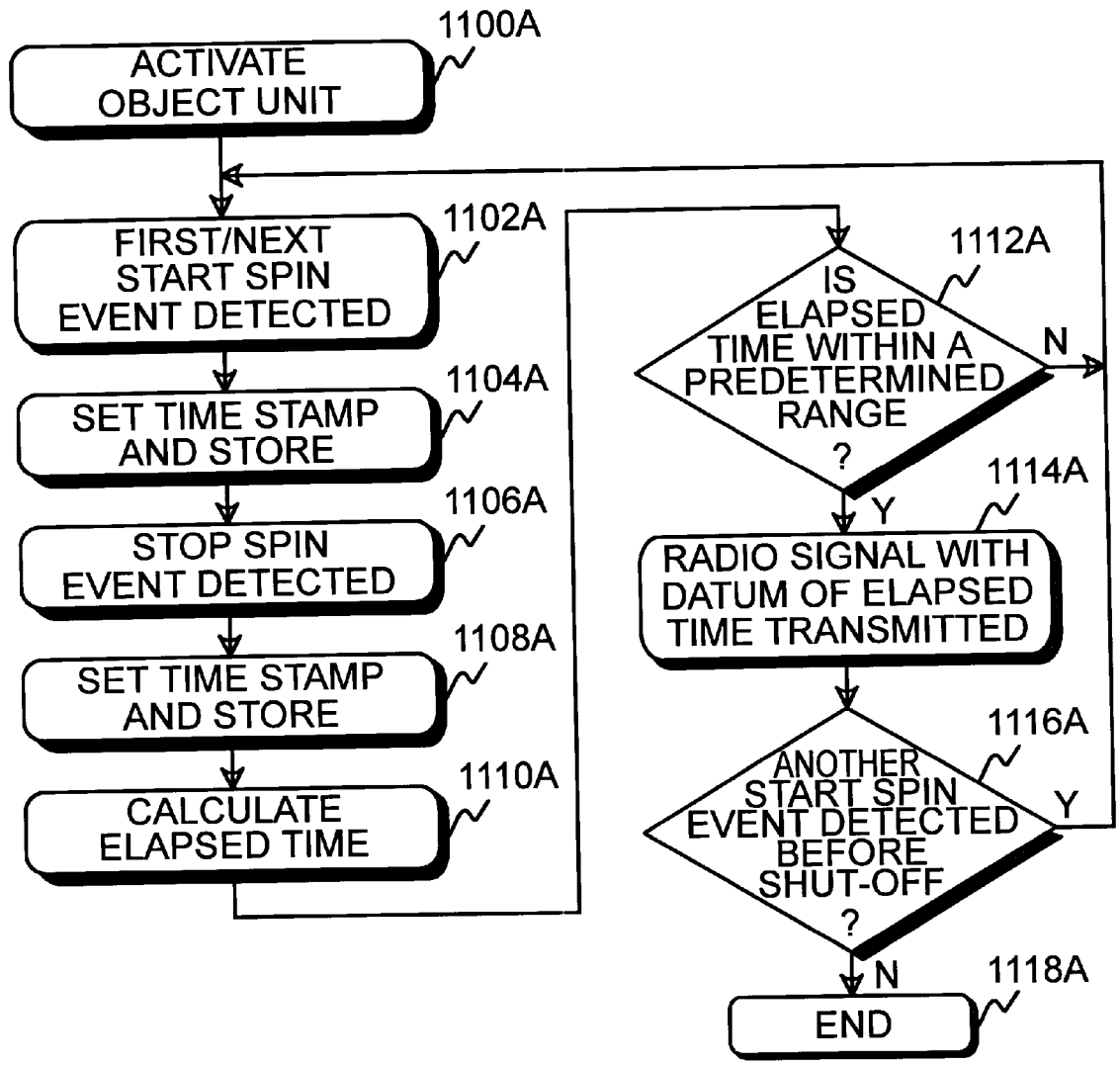
FIG. 11A shows a flowchart of an embodiment of the invention where an object unit transmits a modulated radio transmission containing a datum indicating the elapsed time between the start and end of a spin event.
Figure 11B:
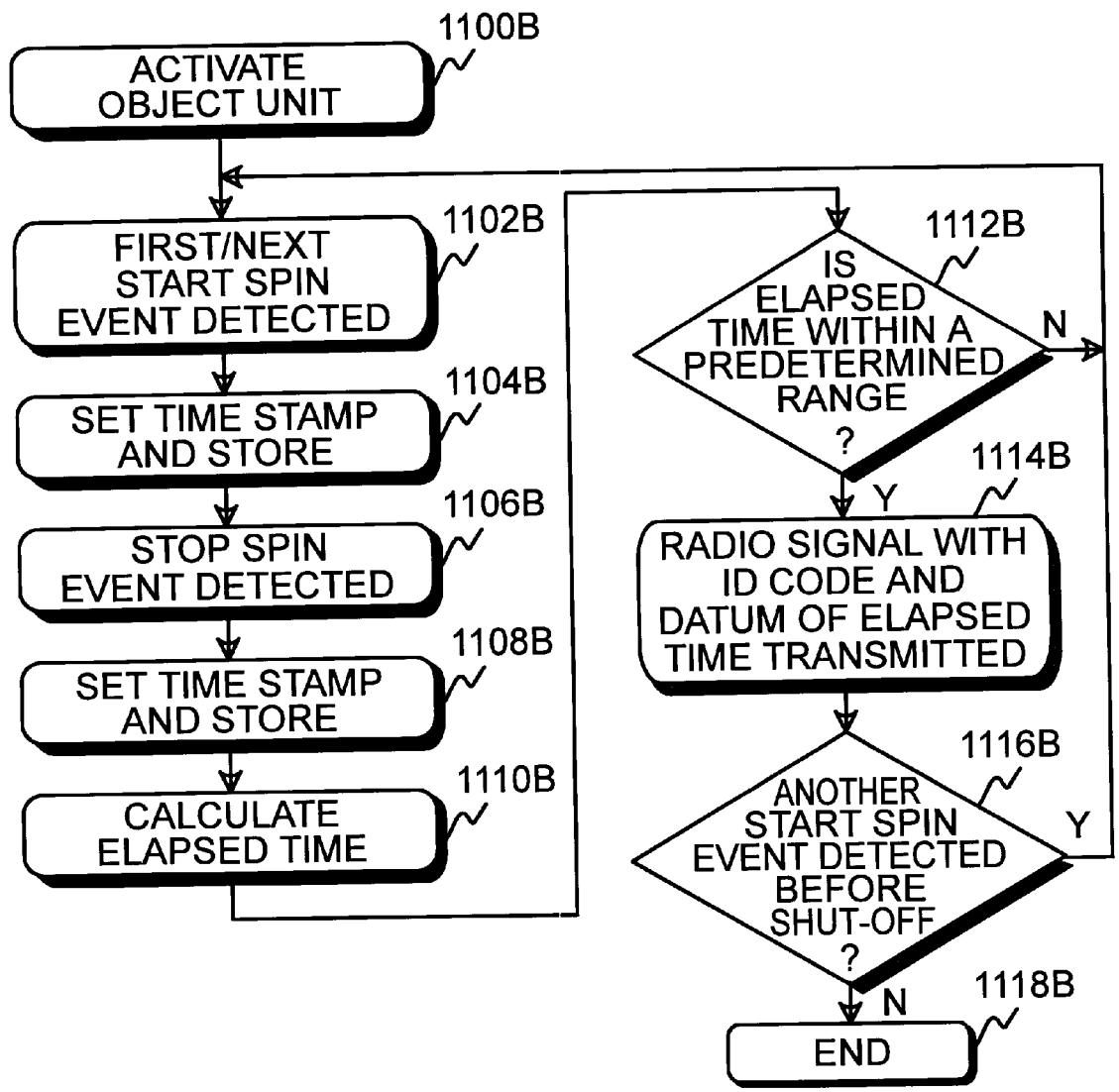
FIG. 11B shows a flowchart of a preferred embodiment of the invention where an object unit transmits a modulated radio transmission containing an identification code and a datum indicating the elapsed time between the start and end of a spin event.
Figure 12A:
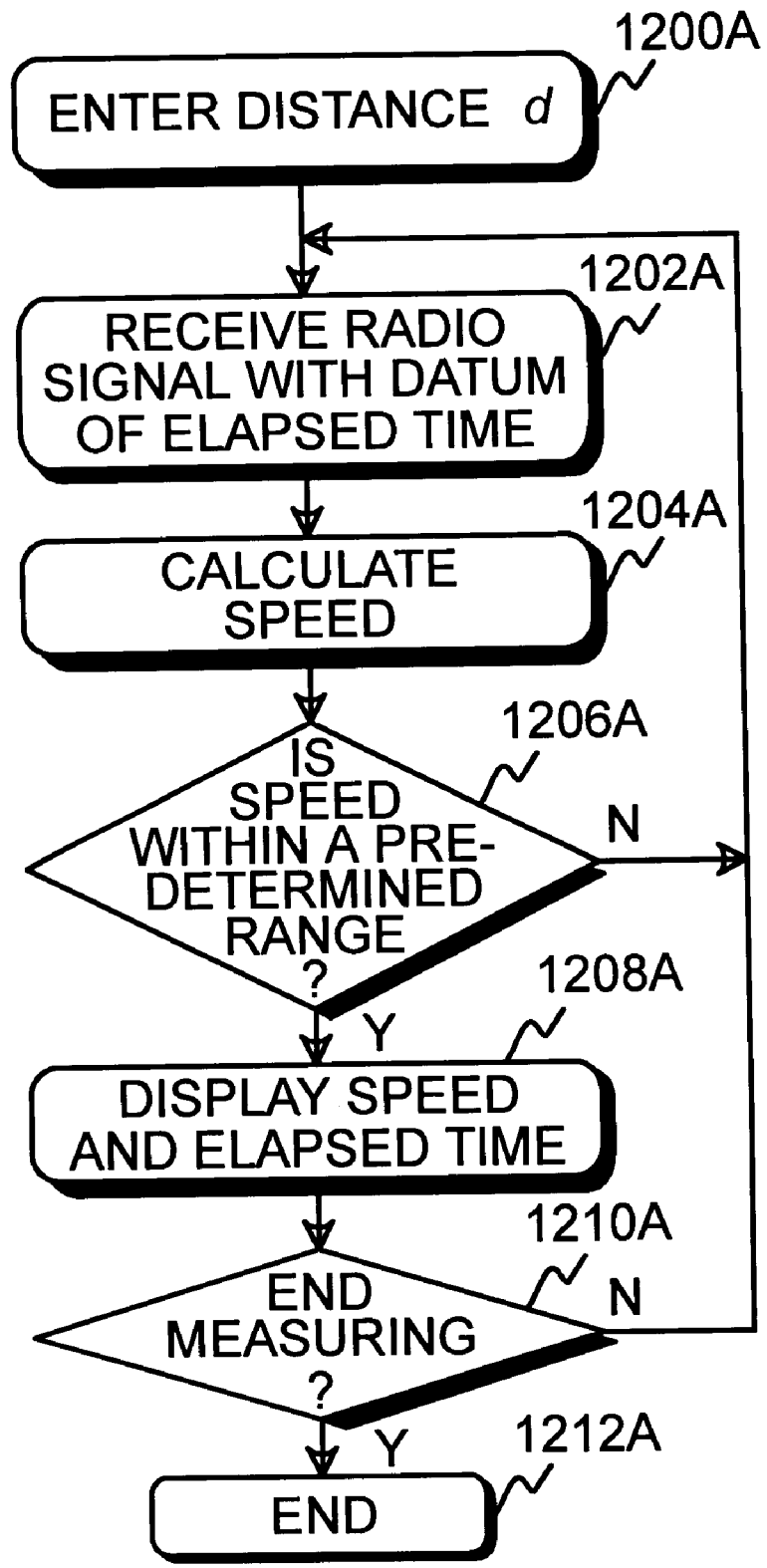
FIG. 12A shows a flowchart of an embodiment of the invention where a monitor unit receives a modulated radio transmission from an object unit of FIG. 11A containing a datum indicating the elapsed time between the start and end of a spin event.
Figure 12B:
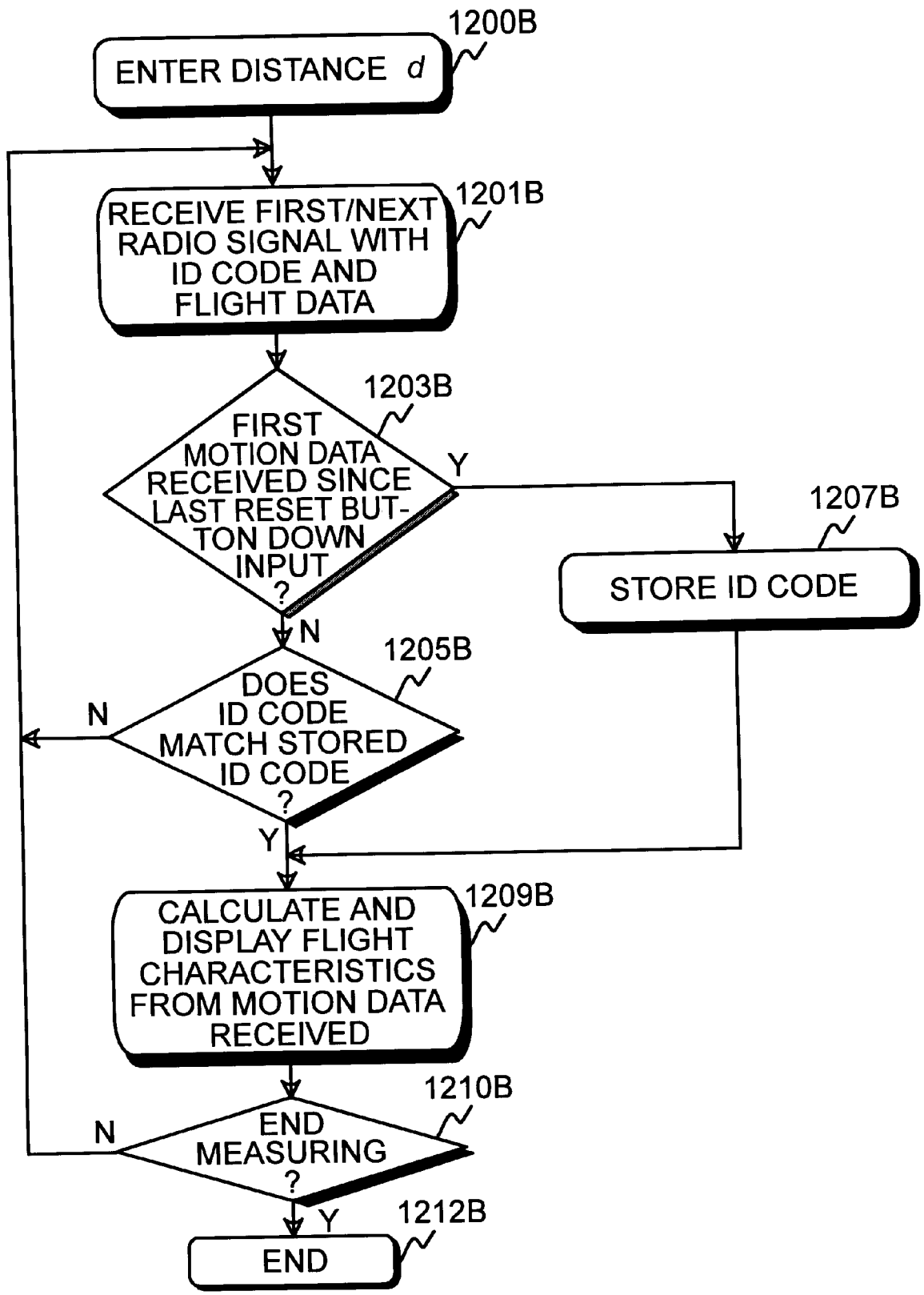
FIG. 12B shows a flowchart of an embodiment of the invention where the monitor unit receives a modulated radio transmission from the object unit from FIG. 11B containing an identification code and a datum indicating the elapsed time between the start and end of a spin event.

For the embodiment of the invention that utilizes identification codes as described in FIGS. 11B and 12B, pressing reset button 226 clears any identification codes previously stored in monitor processor 112, and enables monitor unit 108 to monitor only those signals emanating from the first object unit 100 to send a signal after reset button 226 has been pressed. All other signals from other object units 100 are ignored until reset button 226 is pressed again.

Figure 3:
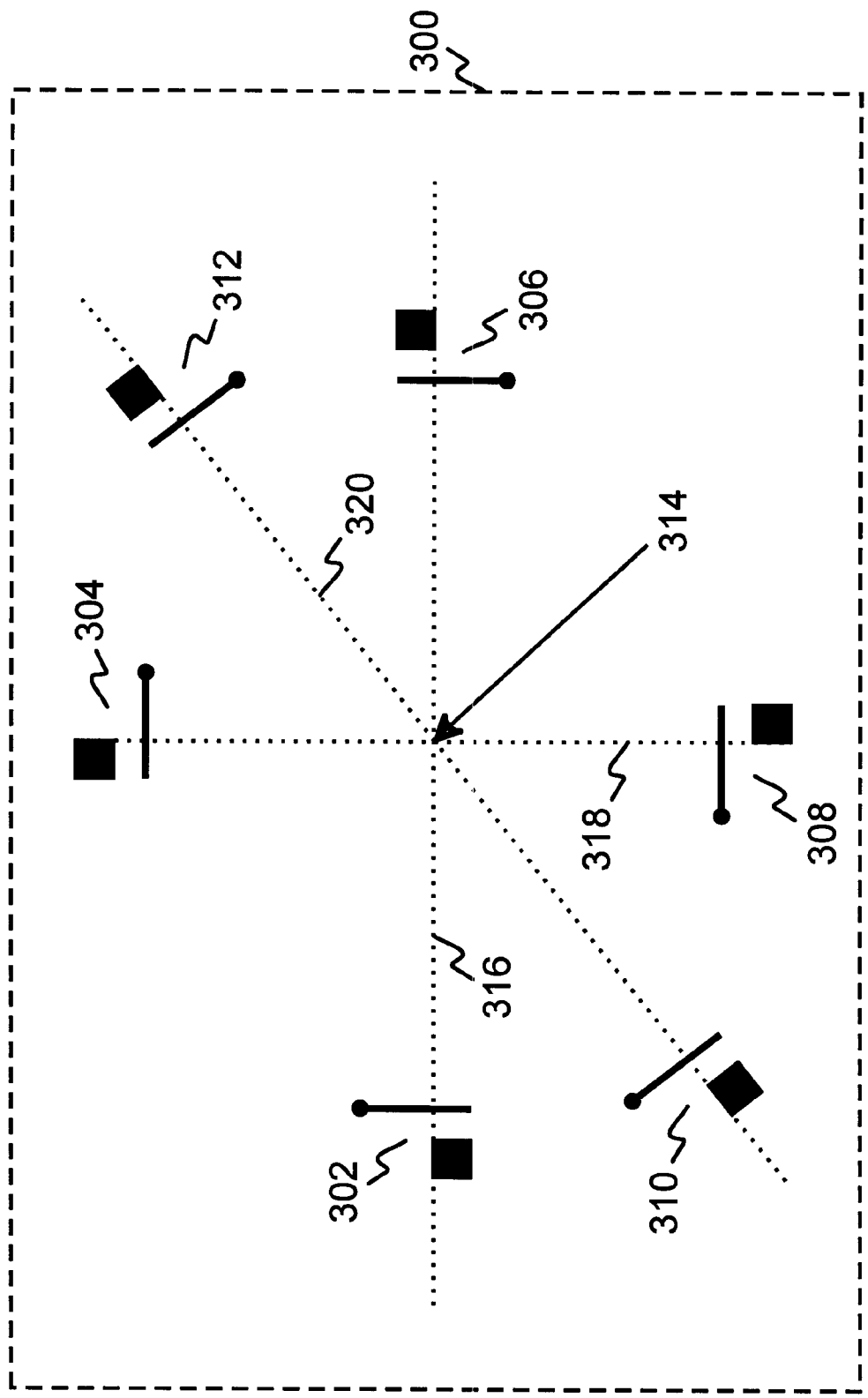
FIG. 3 shows a modified perspective view of an embodiment of an acceleration sensor network, which utilizes simple on/off mechanical g-force sensor switches, of the present invention.

FIG. 3 shows a modified perspective view of an embodiment of an acceleration sensor network, which utilizes simple on/off mechanical g-force sensor switches, of the present invention. The mechanical switch illustrated is representative of a number of various switches that can be used, such as a common mercury or metal ball tilt switch. Referring now to FIG. 3, acceleration sensor network 300 is embedded, secured, or attached in the center of a movable object, such as a baseball, and utilizes simple on/off mechanical g-force sensor switches. Acceleration sensor network 300 is designed to detect or measure the spinning of the movable object about one or more internal axes that run through center of movable object 314. Each mechanical g-force sensor switch, of which there are several suitable common types, such as the tilt switch shown in FIG. 4C, is activated whenever the switch experiences a g-force in excess of its threshold value in its direction of sensitivity. Mechanical g-force sensor switches 302 and 306 lie on a first axis 316, are normally positioned equidistant from center of movable object 314 for balance purposes but not required, and their directions of sensitivity are opposite of each other. The same is true for mechanical g-force sensor switches 304 and 308 which lie on a second axis 318, normally perpendicular to first axis 316, but could be at any angle greater than 0° to the first axis, and normally equidistant from center of movable object 314. Mechanical g-force sensor switches 304 and 308 are sensitive to g-forces normal to the first axis. Though it is possible to sense rotation of the ball about any axis with only mechanical g-force sensor switches 302 and 306 on first axis 316 and mechanical g-force sensor switches 304 and 308 on second axis 318, mechanical g-force sensor switches 310 and 312, located on third axis 320 and normally equidistant from center of movable object 314, may be added for additional sensitivity. Third axis 320 also passes through center of movable object 314 and is normally perpendicular to both first axis 316 and second axis 318, but could be at any angle greater than 0° to a plane containing the first and second axes. Mechanical g-force sensor switches 310 and 3128 are sensitive to g-forces normal to the plane formed by the first and second axes. The orientation options of the sensors and axes discussed above are also applicable to the acceleration sensor networks described in FIGS. 4A, 4C, and 4D below.

The orientation of each sensor's direction of sensitivity is important. When each pair of sensors lie on the same axis and the center of the movable object lies between them, the orientation of sensitivity for each sensor pair must be opposite from each other. When this configuration exists, electronic processor circuit 104 (FIG. 1) determines that the movable object is spinning if:

1. both mechanical g-force sensor switches 302 and 306 were on due to centrifugal force, or
2. both mechanical g-force sensor switches 304 and 308 were on due to centrifugal force, or
3. both mechanical g-force sensor switches 310 and 312 were on due to centrifugal force, or
4. any combination of the above three conditions are true.

Acceleration events occurring due to translational movement of the movable object, such as that occurring in normal handling or bouncing, will be easily filtered out since for such events only one of the two opposing sensors along an axis will turn on.

Figure 4A:
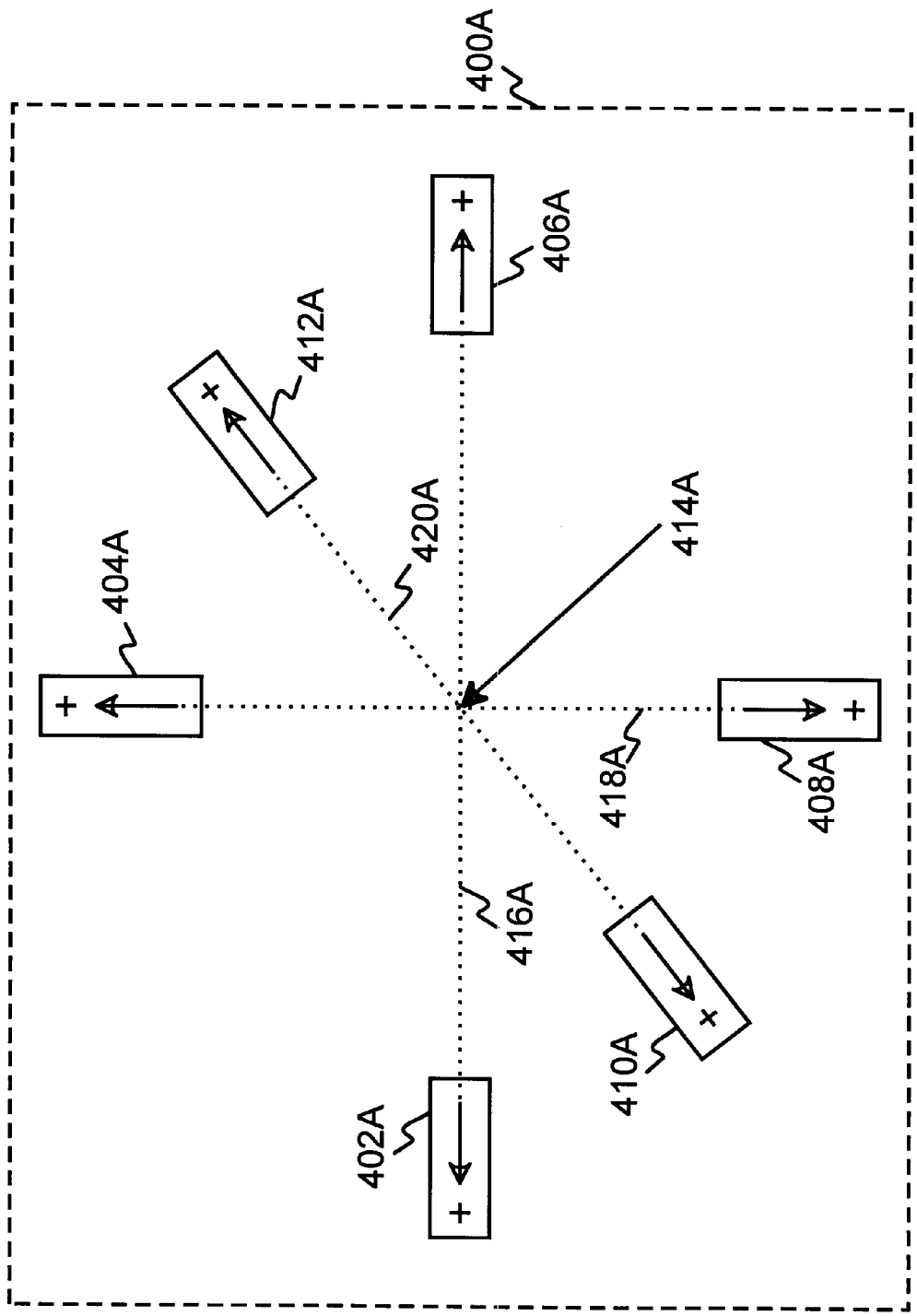
FIG. 4A shows a modified perspective view of another embodiment of an acceleration sensor network, which uses g-force proportional output sensors, of the present invention.

FIG. 4A shows a modified perspective view of another embodiment of an acceleration sensor network, which uses g-force proportional output sensors, of the present invention. Referring now to FIG. 4A, acceleration sensor network 400A is embedded, secured, or attached in the center of a movable object, such as a baseball, and utilizes g-force proportional output sensors that output a g-force proportional signal. The arrangement of g-force proportional output sensors would be the same as for the mechanical g-force sensor switches of FIG. 3.

Acceleration sensor network 400A is designed to detect or measure the spinning of the movable object about one or more internal axes that run through center of movable object 414A. Each g-force proportional output sensor is activated whenever power is supplied to the sensor. The g-force proportional output sensor, when experiencing no g-force, outputs a certain voltage, such as 2.5 volts. When the g-force proportional output sensor experiences g-force, the voltage output either rises above or falls below the no g-force level depending upon its direction of sensitivity.

G-force proportional output sensors 402A and 406A lie on a first axis 416A, are typically equidistant from center of movable object 414A for balance purposes, and their directions of sensitivity are opposite of each other. The same is true for g-force proportional output sensors 404A and 408A which lie on a second axis 418A, and sense g-forces normal to the first axis 416A. Though it is possible to sense rotation of the ball about any axis with only g-force proportional output sensors 402A and 406A on first axis 416A and g-force proportional output sensors 404A and 408A on second axis 418A, g-force proportional output sensors 410A and 412A, located on third axis 420A, may be added for additional sensitivity. Sensors 410A and 412A sense g-forces normal to the plane formed by the first and second axes.

It is important that the positive direction of sensitivity (the voltage output is positive for centrifugal force in this direction) for each sensor along the same axis be arranged in the opposite direction as shown in FIG. 4A. Electronic processor circuit 104 determines that the movable object is spinning if:
1. both g-force proportional output sensors 402A and 406A give an indication of force in their respective positive directions, or
2. both g-force proportional output sensors 404A and 408A give an indication of force in their respective positive directions, or
3. both g-force proportional output sensors 410A and 412A give an indication of force in their respective positive directions, or
4. any combination of the above three conditions are true.

Again, acceleration events occurring due to translational movement of the movable object, such as that occurring in normal handling or bouncing, will be easily filtered out since for such events only one of the two opposing sensors will give a positive indication, and the other will give either no indication or a negative indication, depending on the type of sensor used.

Figure 4B:
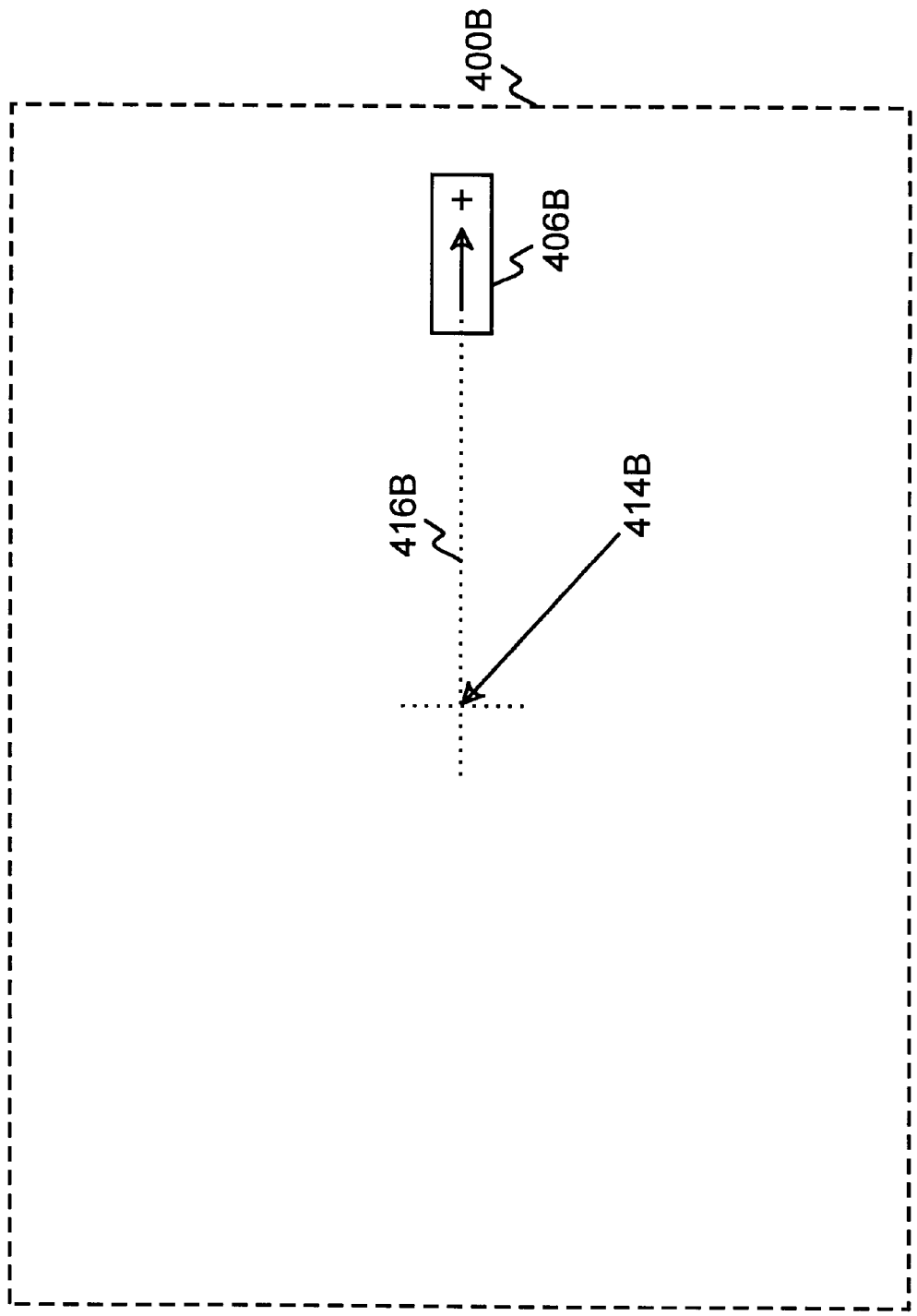
FIG. 4B shows a perspective view of another embodiment of the acceleration sensor network of FIG. 4A, which uses only one g-force proportional output sensor, of the present invention.
Figure 4C:
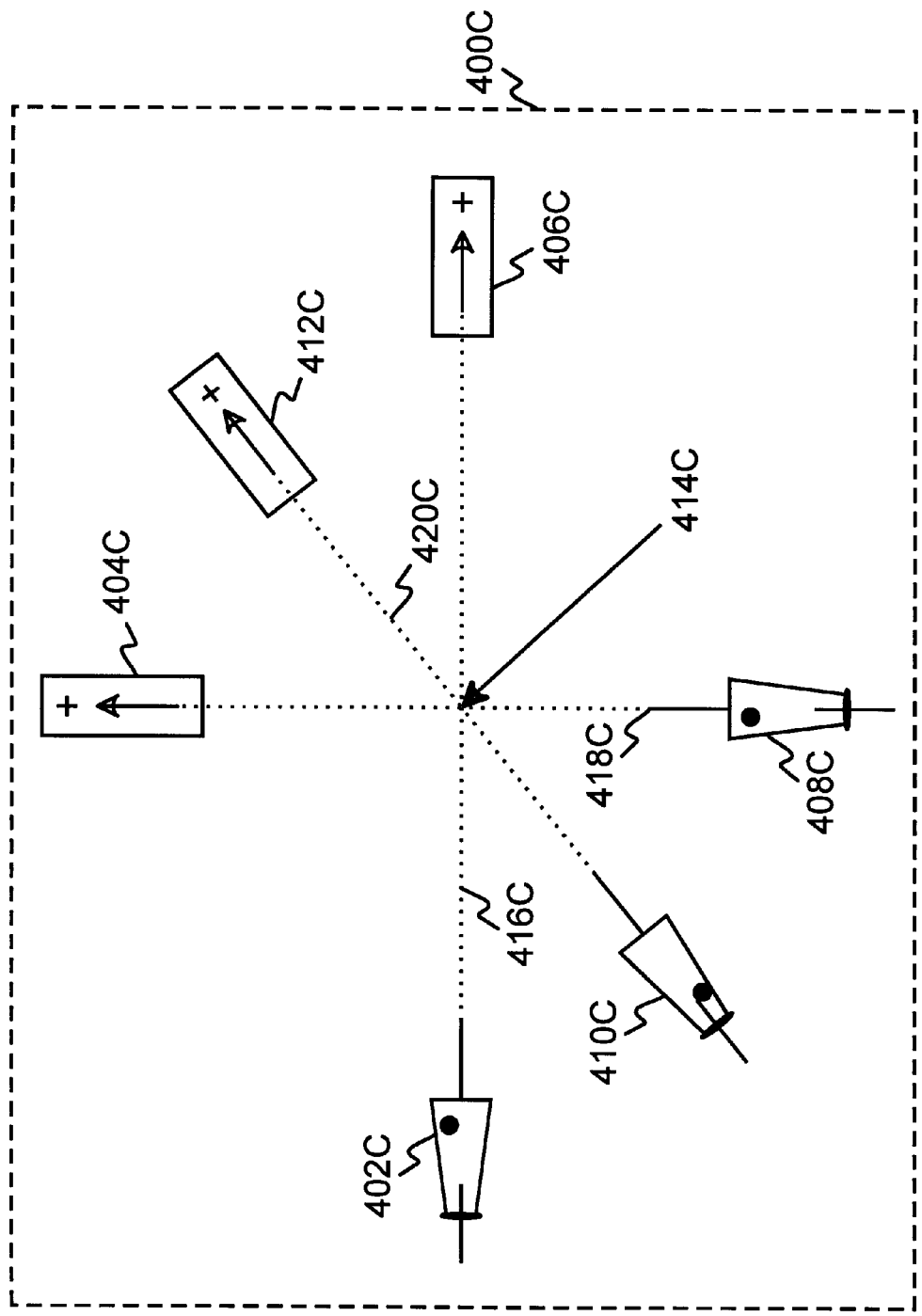
FIG. 4C shows a modified perspective view of another embodiment of the acceleration sensor network of FIG. 4A, which uses mixed pairs of mechanical g-force sensor switches and g-force proportional output sensors, of the present invention.

FIG. 4B shows a perspective view of another embodiment of the acceleration sensor network of FIG. 4A, which uses only one g-force proportional output sensor, of the present invention. Referring now to FIG. 4B, acceleration sensor network 400B is embedded, secured, or attached in a movable object, such as a football, and utilizes only one g-force proportional output sensor 406B that outputs a g-force proportional signal.

Acceleration sensor network 400B is designed to detect or measure the spinning of the movable object about an axis of rotation that runs through the center of movable object 414B and is perpendicular to and comes out of the plane of the page (not shown in FIG. 4B). Such a longitudinal axis is found along the long dimension of a football, running through a center line of the football from tip to tip. Typically, when a football is passed by a player in a spiral fashion, the football rotates about this longitudinal axis while in flight.

G-force proportional output sensor 406B lies on a first axis 416B which, in the preferred embodiment of the invention, is perpendicular to the axis of rotation that runs through center of movable object 414B and is perpendicular to and comes out of the plane of the page (not shown in FIG. 4B). However, g-force proportional output sensor 406B could lie on any axis that is at an angle greater than zero to the axis of rotation.

Using acceleration sensor network 400B, it is possible to distinguish g-force due to linear acceleration and g-force due to centrifugal acceleration by virtue of the duration and strength of acceleration given a particular application (such as a football pass). The spin rate of a passed football does not decrease appreciably over the football's flight until it is caught, batted down, or falls to the ground. Knowing this, a flight event can be inferred given that:
1. The g-force measured is consistent with the centrifugal force due to the normal range of spin rates imparted on a football by a human user; and
2. The g-force measured remains fairly consistent or monitonically declines slightly over a period of time that is consistent with the flight time arising from a pass of a predetermined distance.

If conditions one and two above are met, electronic processor circuit 104 of object unit 100 embedded within the movable object would transmit the time-of-flight and g-force data to monitor unit 108.

FIG. 4C shows a modified perspective view of another embodiment of the acceleration sensor network of FIG. 4A, which uses mixed pairs of mechanical g-force sensor switches and g-force proportional output sensors, of the present invention. Referring now to FIG. 4C, acceleration sensor network 400C is embedded, secured, or attached in the center of a movable object, such as a baseball, and utilizes g-force proportional output sensors that output a g-force proportional signal in combination with less costly mechanical switch type sensors. The arrangement of g-force proportional output sensors in mixed combination with the mechanical switches is similar to that shown in FIG. 4A. Since the centrifugal force measured by two g-force proportional sensors diametrically opposed along the same axis should be identical, only one g-force proportional sensor is really needed to determine the centrifugal force along an axis due to spinning of the object. This reduces the overall cost of object unit 100, since g-force proportional output sensors are generally more expensive than mechanical g-force sensors.

Acceleration sensor network 400C is designed to detect or measure the spinning of the movable object about one or more internal axes that run through center of movable object 414C. Each mechanical sensor switch is activated whenever each switch experiences a g-force in excess of its threshold value in its direction of sensitivity.

Mixed pair mechanical g-force sensor switch 402C and g-force proportional output sensor 406C, referred to as a pair of mixed g-force sensors, lie on a first axis 416C, are normally equidistant from center of movable object 414C for balance purposes unless their respective weights are different, and their directions of sensitivity are opposite of each other. For some applications, only one pair of mixed g-force sensors, lying along one axis would be sufficient for measuring the motion data of interest.

For applications requiring two axis for measuring the motion data of interest, mixed pair mechanical g-force sensor switch 408C and g-force proportional output sensor 404C, referred to as a pair of mixed g-force sensors, lie on a second axis 418C, which is optimally perpendicular to first axis 416C, so that the sensors 408C and 404C are sensitive to g-forces normal to the first axis. Though it is possible to sense rotation of the ball about any axis with only mixed pair g-force proportional output sensor 404C and 406C and mixed pair mechanical g-force sensor switches 402C and 406C on first axis 416C and on second axis 418C, mixed pair mechanical g-force sensor switch 410C and g-force proportional output sensor 412C, located on third axis 420C, may be added for additional accuracy. Sensors 410C and 412C are sensitive to g-forces normal to the plane formed by the first and second axes.

For each mixed pair of g-force proportional output sensor and mechanical g-force sensor switch along the same axis, it is important that the positive direction of sensitivity for each sensor be arranged in the opposite direction. For example, as shown in FIG. 4C, g-force proportional output sensor 412C is positively sensitive in the direction shown by the arrow, which is outward from center of movable object 414C.

The mechanical g-force sensor switches shown in FIG. 4C are tilt switches, having a conductive ball contained within a cylindrical or conical can shaped body. One skilled in the art will recognize that other types of mechanical switches could also be used. Mechanical g-force sensor switch 410C is positively sensitive in a direction outward from center of movable object 414C, and is depicted in FIG. 4C in the "on" position (closed) providing electrical connectivity between the can and the pin, indicating g-force in its direction of sensitivity. Mechanical g-force sensor switches 402C and 408C are shown in the "off" position (open, no electrical connectivity between the can and the pin), indicating no g-force or g-force less than its threshold value.

Electronic processor circuit 104 determines that the movable object is spinning if:

1. g-force proportional output sensor 406C gives an indication of force in its positive direction (away from the center of movable object 414C), and mechanical g-force sensor switch 402C is on (in the closed position); or
2. g-force proportional output sensor 404C gives an indication of force in its positive direction (away from the center of movable object 414C), and mechanical g-force sensor switch 408C is on (in the closed position); or
3. g-force proportional output sensor 412C gives an indication of force in its positive direction (away from the center of movable object 414C), and mechanical g-force sensor switch 410C is on (in the closed position); or
4. any combination of the above three conditions are true.

Again, acceleration events occurring due to translational movement of the movable object, such as that occurring in normal handling or bouncing, will be easily filtered out since for such events only one of the two opposing sensors will give a positive indication, and the other will give either no indication or a negative indication, depending on the type of sensor used.

Figure 4D:
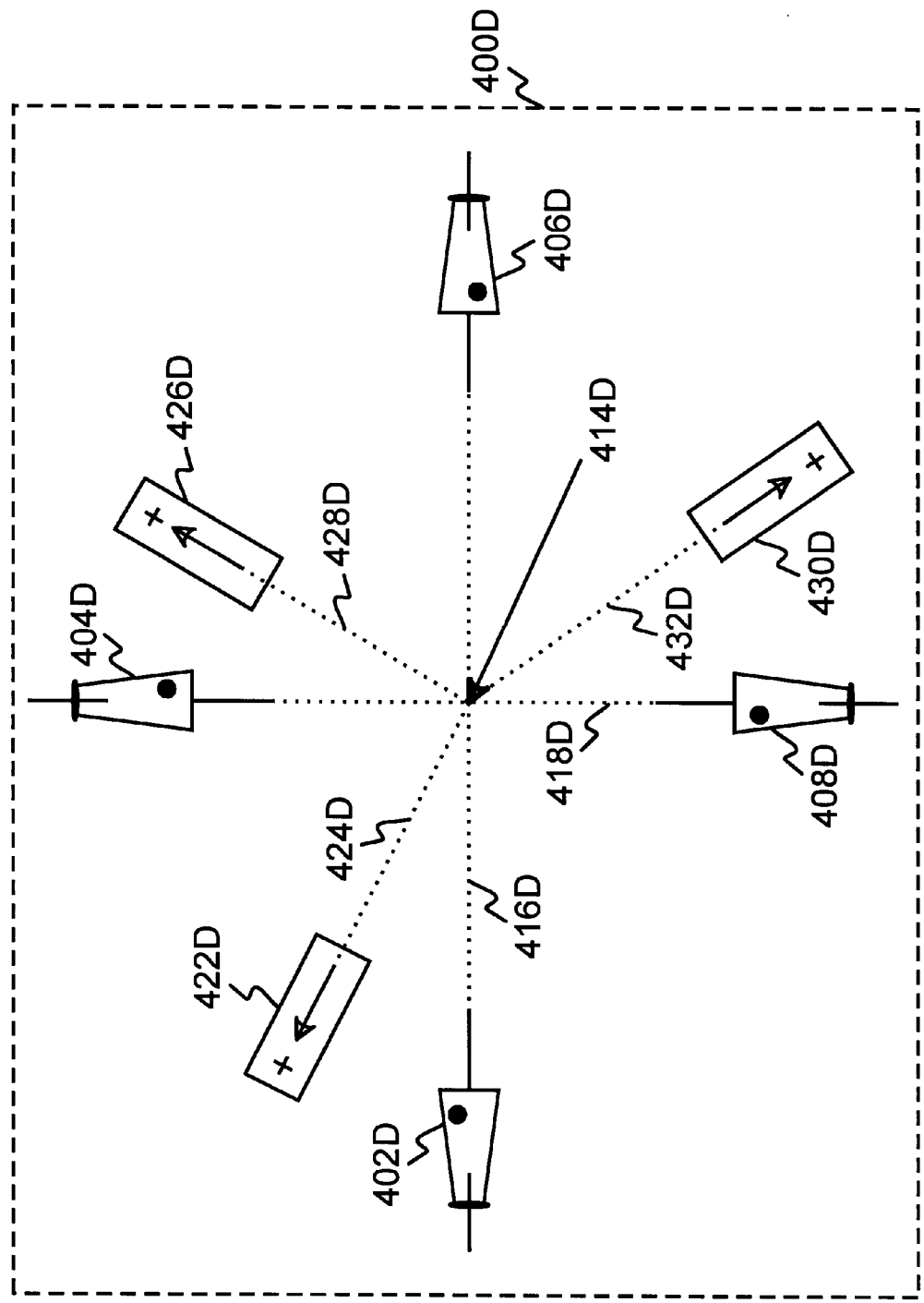
FIG. 4D shows a modified perspective view of another embodiment of the acceleration sensor network of FIG. 4A, which uses mechanical g-force sensor switches and g-force proportional output sensors, of the present invention.

FIG. 4D shows a modified perspective view of another embodiment of the acceleration sensor network of FIG. 4A, which uses mechanical g-force sensor switches and g-force proportional output sensors, of the present invention. Referring now to FIG. 4D, acceleration sensor network 400D is embedded, secured, or attached in the center of a movable object, such as a baseball, and utilizes a totally mechanical g-force sensor switch network to detect spin, and g-force proportional output sensors oriented with sensitivity to centrifugal force outward from the center of the rotating object, without using the g-force proportional output sensors in pairs. This technique reduces both cost and power consumption.

Acceleration sensor network 400D is designed to detect and measure the spinning of the movable object about one or more internal axes that run through the center of movable object 414D. Mechanical g-force sensor switches 402D and 406D lie on a first axis 416D, are normally equidistant from center of movable object 414 for balance purposes, and their directions of sensitivity are opposite of each other. For some applications, only one pair of sensors lying along one axis would be sufficient for measuring the motion data of interest.

For applications requiring two axis for measuring the motion data of interest, mechanical g-force sensor switches 404D and 408D lie on a second axis 418D. Sensors 404D and 408D sense g-forces normal to the first axis, 416D. Though it is possible to sense rotation of a movable object about any axis with only mechanical g-force sensor switches 402D and 406D on first axis 416D and mechanical g-force sensor switches 404D and 408D and on second axis 418D, a third pair of mechanical g-force sensor switches (not shown in FIG. 4D), located on a third axis (also not shown in FIG. 4D) and normally equidistant from center of movable object 414D, may be added for additional accuracy. The mechanical g-force sensor switch network, comprised of mechanical g-force sensor switch pair 402D and 406D on first axis 416D and mechanical g-force sensor switch pair 404D and 408D on second axis 418D, and possibly a third mechanical g-force sensor switch pair on a third axis, are used to detect spin.

One or more g-force proportional output sensors are oriented along one or more axes, or radii, emanating from the center of movable object 414D. The g-force proportional output sensors are oriented such that they can measure centrifugal force arising from the movable object's rotation. The axes or radii along which the g-force proportional output sensors lie may or may not coincide with any of the axes along which the mechanical sensors lie. In FIG. 4D, g-force proportional output sensor 422D lies on radii 424D. G-force proportional output sensor 426D lies on radii 428D, and senses g-forces normal to radii 424D. G-force proportional output sensor 430D lies on radii 432D, and senses g-forces normal to the plane formed by radii 424D and 426D. The radii along which the g-force proportional output sensors lie are completely independent of the axes along which the mechanical g-force sensor switches 402D, 404D, 406D, and 408D lie, though each g-force proportional output sensor could lie upon the same axes as the mechanical g-force sensor switch pairs.

For a rotating sphere, such as a baseball, the mechanical g-force sensor switch network would optimally consist of a pair of diametrically opposed switches along each of two orthogonal axes. For the most accurate measurement in a sphere that can rotate along any imaginary axis through the center of the sphere, at least three g-force proportional output sensors should be used, each lying along a radius that is perpendicular to the radii along which the other two sensors lie, where the radii emanate from the center of the sphere. Engineered counter balancing of the weight of the three sensors would be important for the ball's flight characteristics.

Once electronic processor circuit 104 determines that the movable object is spinning by virtue of the output from the mechanical g-force sensor switch network, a reading of the output of the g-force proportional output sensors would give an indication of the degree of centrifugal force present.

Since mechanical g-force sensor switches are generally less costly than g-force proportional output sensors, this arrangement can provide a cost reduction over a movable object that utilizes three pairs of g-force proportional switches that are diametrically opposed about the center of a movable object as shown in FIG. 4A. This arrangement also enables the g-force proportional sensors to be kept in a low power mode, or totally unpowered, until spin is detected by the output from the mechanical g-force sensor switch network. Once spin is detected by the mechanical g-force sensor switch network, power would be supplied to the g-force proportional output sensors 422D, 426D, and 430D. Electronic processor circuit 104 would receive readings of the centrifugal force present. Power would be turned off to g-force proportional output sensors 422D, 426D, and 430D. The g-force data would then be transmitted to monitor unit 108. This approach confines power consumption by the g-force proportional output sensors to very brief periods that occur only during flight, and would greatly prolong the life of the battery which powers object unit 100 (FIG. 1).

Figure 4E:
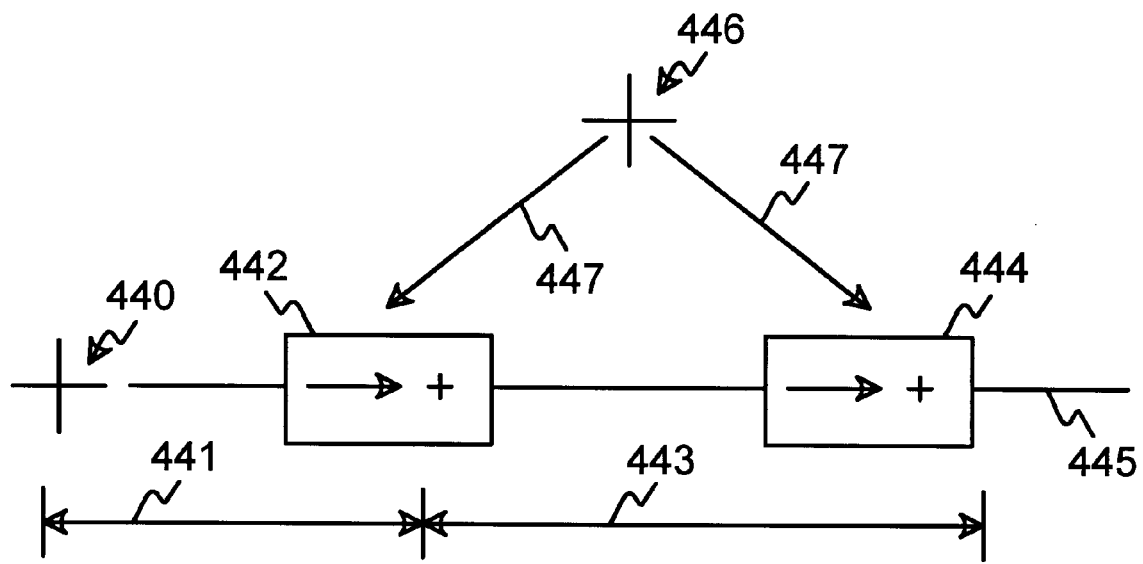
FIG. 4E shows a modified perspective view of another embodiment of an acceleration sensor network and illustrates that the sensors need have no particular relationship to the center of the movable object.
Figure 4E:
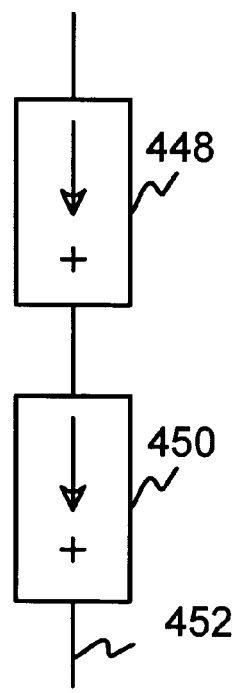

FIG. 4E illustrates that the sensors can be located in any relationship to the center of the movable object. In FIG. 4E, two g-force proportional output sensors, 442 and 444, lie along a line 445 in the movable object, thus forming an aligned pair of sensors, but at no defined relationship to the center of the movable object. The sensors are oriented such that they can sense a g-force vector component along line 445. For all translational acceleration that the movable object undergoes, sensor 442 and sensor 444 will be subjected to the same g-forces and will provide essentially equivalent g-force readings. However, when the object is rotating about point 440 sensor 444 will be subjected to a greater centrifugal g-force than sensor 442 since it is further from the axis of rotation. In fact, with one exception that is discussed below, no matter where the axis of rotation is in the spinning object, the centrifugal g-force vector measured by sensor 442 and the centrifugal g-force vector measured by sensor 444 when the object is spinning will be different because the two sensors are separated in space by distance 443. For example, if the center of rotation is point 446 and sensors 442 and 444 are both distance 447 from point 446, sensor 442 and sensor 444 will experience identical centrifugal g-force magnitudes both with opposite polarity.

The one exception is that the axis of rotation is exactly parallel to or coincident with line 445. If this occurs, both sensors 442 and 444 will experience identical g-forces, and since those g-forces would be normal to line 445, they would measure 0 g's. To detect spin occurring according to this exception using additional g-force proportional sensors, the additional sensors must be oriented to sense centrifugal g-forces that are normal to radius 446. This is depicted by sensors 448 and 450. Again, spin is indicated if the g-force sensed by sensor 448 along line 452 and the g-force sensed by sensor 450 along line 452 are different.

To summarize, and electronic processor circuit determines that the movable object is spinning if g-force proportional sensor 442 senses a g-force that differs from g-force proportional sensor 444, or g-force proportional sensor 448 senses a g-force that differs from g-force proportional sensor 450.

Figure 5:
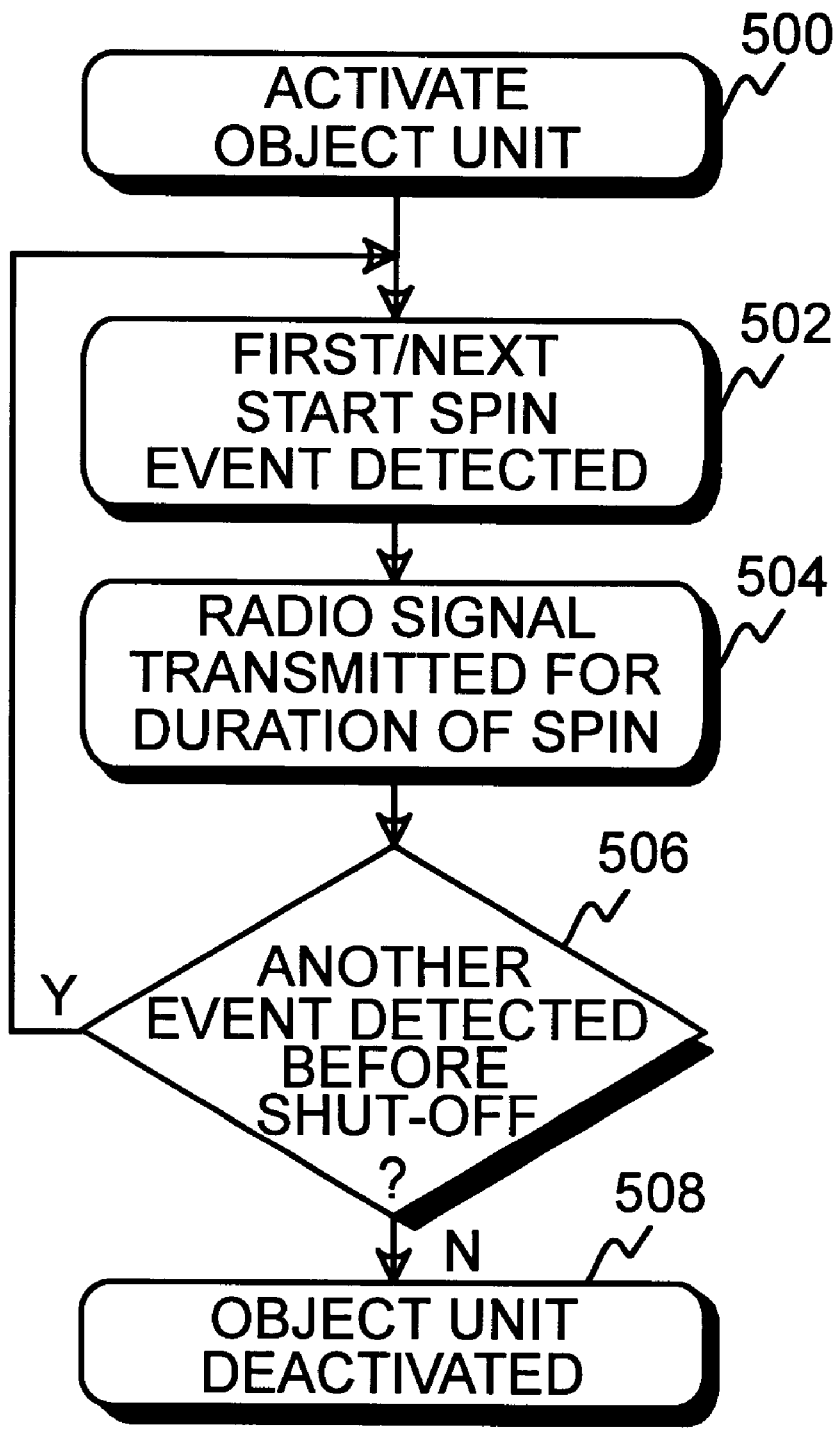
FIG. 5 shows a flowchart of a an embodiment of the invention where an object unit transmits a radio signal whenever spin is detected for the duration of the spin event.

FIG. 5 shows a flowchart of an embodiment of the invention where object unit 100 (FIG. 1) transmits a non-modulated radio signal whenever spin is detected for the duration of the spin event. Spin is detected by utilizing one of the acceleration sensor networks described in FIG. 3 or FIGS. 4A, 4B, 4C, 4D, or 4E.

Referring now to FIG. 5, in step 500 object unit 100 (FIG. 1) is activated. In step 502 a first or subsequent spin event is detected by acceleration sensor network 102 (FIG. 1). In step 504 a non-modulated radio signal is transmitted continuously for the duration of the spin event. In step 506, if another spin event is detected before the predetermined shut-off time (typically one minute), then control returns to step 502. If not, control passes to step 508 where object unit 100 is deactivated through its shut-off circuitry.

Figure 6:
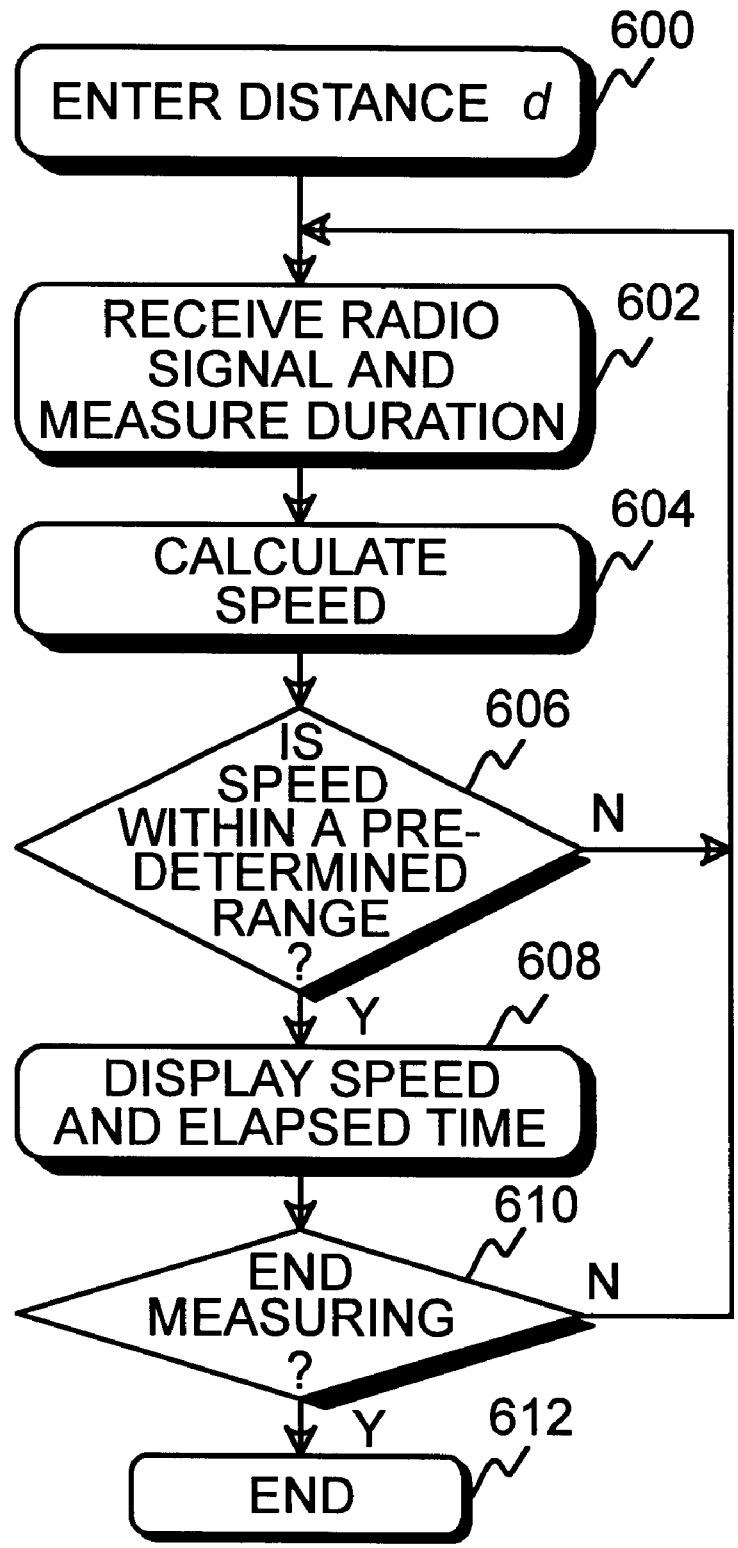
FIG. 6 shows a flowchart of an embodiment of the invention where a monitor unit receives a radio signal from an object unit of FIG. 5 whenever spin is detected for the duration of the spin event.

FIG. 6 shows a flowchart of an embodiment of the invention where monitor unit 108 (FIG. 1) receives a non-modulated radio signal from object unit 100 of FIG. 5 whenever spin is detected for the duration of the spin event.

Referring now to FIG. 6, in step 600 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 602 radio receiver 110 (FIG. 1), which is tuned to the same frequency as radio transmitter 106 (FIG. 1), receives the radio signal sent from radio transmitter 106 from FIG. 5 and measures the duration of the received signal to determine the time of flight. Interference between nearby units of the invention under simultaneous use can be avoided by producing units of the invention that use several different frequencies and avoiding the use of objects with the same frequency in close proximity.

In step 604 the distance d from step 600 is divided by the time of flight from step 602 to determine the speed of the object containing object unit 100 (FIG. 1). Monitor unit 108 may be programmed to calculate peak, minimum, or average speed. Step 606 checks to see of the speed falls within a predetermined speed range for the particular application. If not, then control returns to step 602 to await the next radio signal. If yes, control passes to step 608 where the speed and time of flight are shown in speed display 208 (FIG. 2) and time display 206 (FIG. 2). Trajectory height may also be calculated and displayed in height display 210 (FIG. 2) if the event being measured is a football punt, batted baseball, or golf shot. Control then passes to step 610 to determine if measuring of more spin events is to end. If not, control returns to step 602 to receive more signals. If yes, step 612 ends the operation of the invention.

Figure 7:
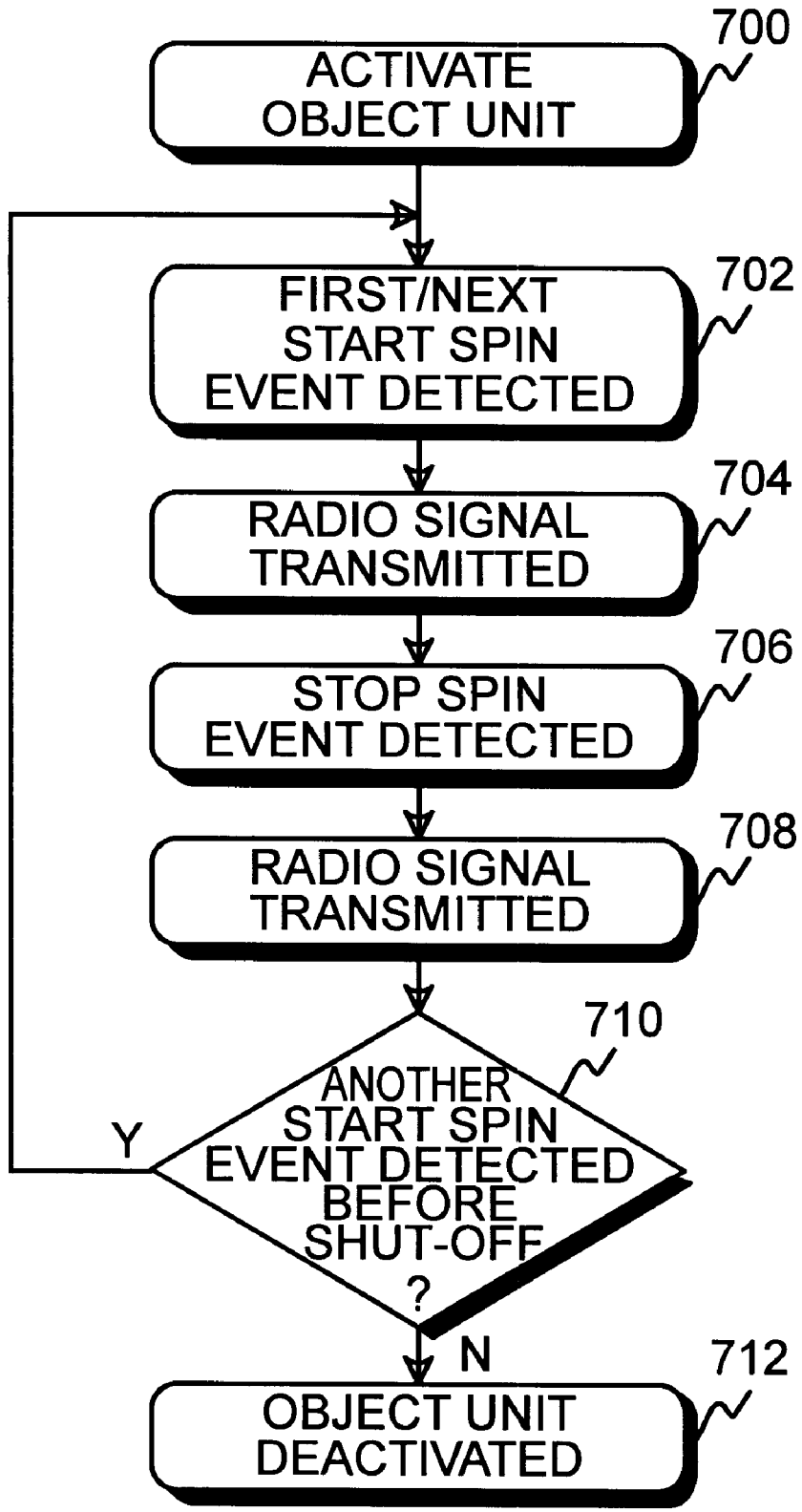
FIG. 7 shows a flowchart of an embodiment of the invention where an object unit transmits a non-modulated, fixed duration, radio signal spin event marker whenever the start of spin is detected and when the cessation of spin is detected.

FIG. 7 shows a flowchart of an embodiment of the invention where object unit 100 (FIG. 1) transmits a non-modulated, fixed duration, radio signal spin event marker whenever the start of spin is detected and when the cessation of spin is detected. Spin is detected by utilizing one of the acceleration sensor networks described in FIG. 3 or FIGS. 4A, 4B, 4C, 4D, or 4E.

Referring now to FIG. 7, in step 700 object unit 100 (FIG. 1) is activated. In step 702 a first or subsequent start spin event is detected by acceleration sensor network 102 (FIG. 1). In step 704 a non-modulated radio signal of a fixed duration is transmitted as a result of the start spin event. In step 706, acceleration sensor network 102 detects the cessation of spinning, a stop spin event. In step 708 a non-modulated radio signal of a fixed duration is transmitted as a result of the stop spin event. In step 710, if another start spin event is detected before the predetermined shut-off time (typically one minute), then control returns to step 702. If not, control passes to step 712 where object unit 100 is deactivated through its shut-off circuitry.

Figure 8:
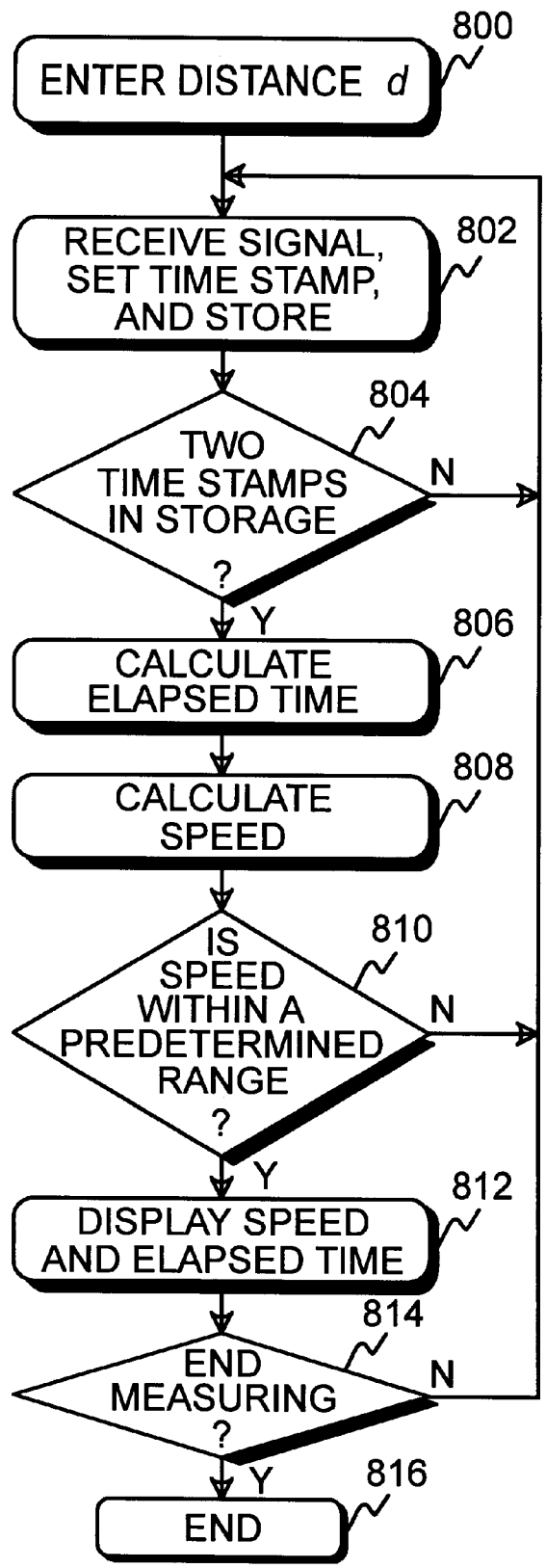
FIG. 8 shows a flowchart of an embodiment of the invention where a monitor unit receives non-modulated, fixed duration, radio signal event markers from an object unit of FIG. 7 at the start of a spin event and at the end of a spin event.

FIG. 8 shows a flowchart of an embodiment of the invention where monitor unit 108 (FIG. 1) receives non-modulated, fixed duration, radio signal event markers from object unit 100 of FIG. 7 at the start of a spin event and at the end of a spin event.

Referring now to FIG. 8, in step 800 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 802 radio receiver 110 (FIG. 1), which is tuned to the same frequency as radio transmitter 106 (FIG. 1), receives from radio transmitter 106 a radio signal spin event marker from FIG. 7, and a time stamp is set and stored in a first position in monitor processor 112. Upon receiving the next radio signal spin event marker from radio transmitter 106, another time stamp is set. The time stamp in the first position in monitor processor 112 is moved to a second position in monitor processor 112, and the new signal's time stamp is stored in the first position. Upon receipt of the next signal, the time stamp in the first position is moved to the second position, overwriting the time stamp that was already there, and the most recent signal's time stamp is stored in the first position. This queuing process is repeated each time a new radio signal spin event marker is received.

In step 804 a check is made to determine if there are two time stamps in storage. If not, control returns to step 802. If two time stamps are in storage, control passes to step 806 which determines the elapsed time of the spin event by subtracting the time stamp stored in the second position from the time stamp stored in the first position to determine the time of flight, or elapsed time, of the object. Then in step 808 the distance d from step 800 is divided by the time of flight from step 806 to determine the average speed of the object. In step 810 a check is made to determine if the speed falls within a predetermined range, such as 20–100 MPH for a baseball pitch. If not, control returns to step 802 to receive the next radio signal spin event marker. If yes, step 812 displays the speed in speed display 208 (FIG. 2) and the time of flight in time display 206 (FIG. 2). Control then passes to step 814 to determine if measuring is to end. If not, control passes to step 802. If yes, step 816 ends the operation of the invention.

Figure 9:
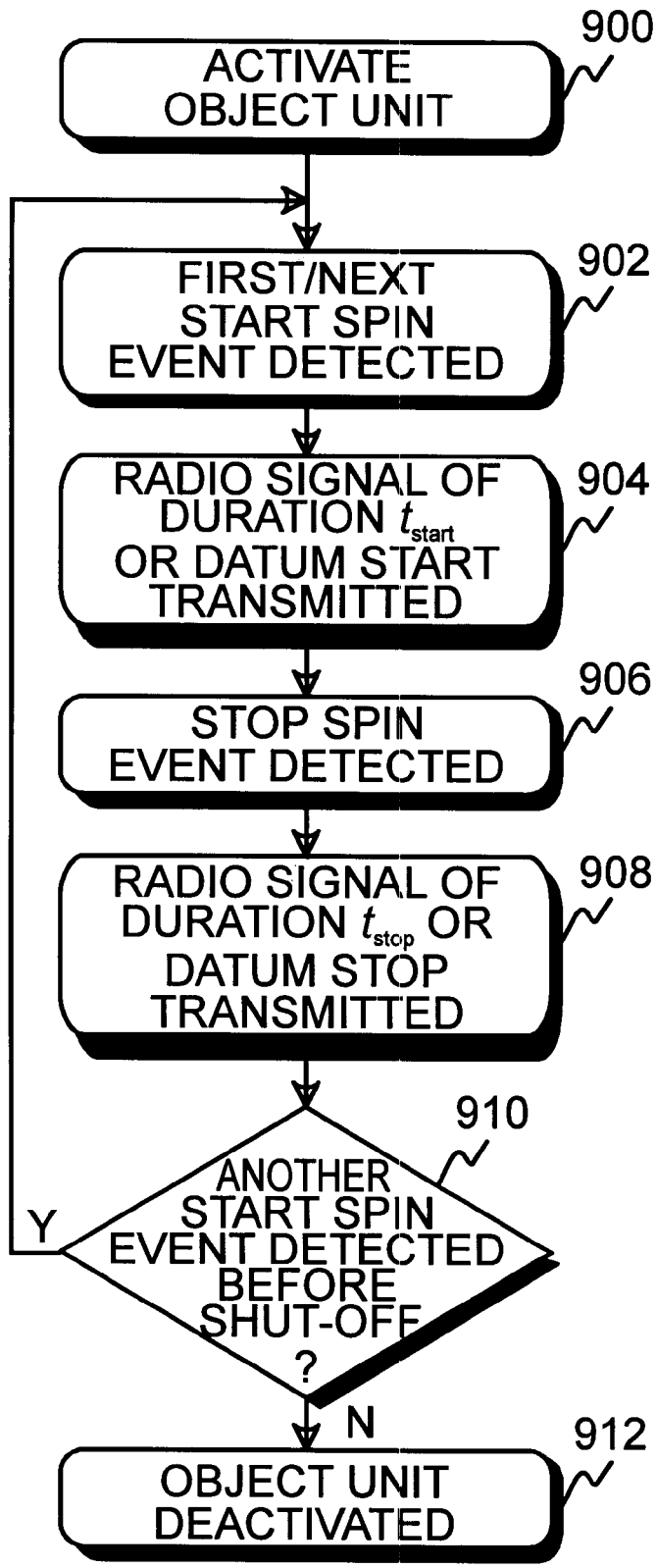
FIG. 9 shows a flowchart of an embodiment of the invention where an object unit transmits a non-modulated or modulated radio signal indicating a start spin event or stop spin event.

FIG. 9 shows a flowchart of an embodiment of the invention where object unit 100 (FIG. 1) transmits a non-modulated or modulated radio signal indicating a start spin event or stop spin event. Spin is detected by utilizing one of the acceleration sensor networks described in FIG. 3 or FIGS. 4A or 4C.

The modulation strategy addresses the interference issue that arises when multiple numbers of the invention are used in the same vicinity by modulating the motion data emanating from the object unit with an identification code that is unique to that object unit. Another embodiment of an identification code mating scheme is described in FIGS. 11B and 12B.

Referring now to FIG. 9, the monitor unit 108 packaged with the object unit 100 (FIG. 1) in this embodiment is factory preset to recognize its mate by way of an identification code as well as a selected frequency. A monitor unit 108 may 'hear' many different signals in an environment crowded with similar object unit 100s but will accept only the signals marked with the identification code of its mate. In this strategy, interference is limited to the garbling of transmitted motion data that occurs if two object unit 100s transmit event markers simultaneously on the same frequency. A monitor unit 108 that uses an identification code would normally be factory preset to work with a specific object unit 100 that is factory preset to the same identification code. However, a monitor unit 108 designed to allow the user to program the object unit 100 identification code of interest could be used with different object unit 100s. That is, one monitor unit 108 could simultaneously display trajectory statistics for a multiplicity of object unit 100s and the object unit 100s could be used simultaneously. However, if spin events for two or more object units occur at the same instant and result in the transmission of the event markers at the same instant at the same frequency, the system will not work. The probability of this occurring is a function of the number of movable objects being monitored on the same frequency, the frequency of spin events per object unit, and the duration of each spin event marker transmission.

The description of steps 900 through 902 is the same as shown in FIG. 7 in corresponding steps 700 through 702. In step 904, either a non-modulated radio signal of duration $t_{start}$ is transmitted as a result of the start spin event, or a modulated radio signal containing a datum indicating that the spin event marker is for a start spin event is sent. In step 906, acceleration sensor network 102 detects the cessation of spinning, a stop spin event. In step 908 a non-modulated radio signal of duration $t_{stop}$ is transmitted as a result of the stop spin event, or a modulated radio signal containing a datum indicating that the spin event marker is for a stop spin event is sent. In step 910, if another start spin event is detected before the predetermined shut-off time (typically one minute), then control returns to step 902. If not, control passes to step 912 where object unit 100 is deactivated through its shut-off circuitry.

Figure 10:
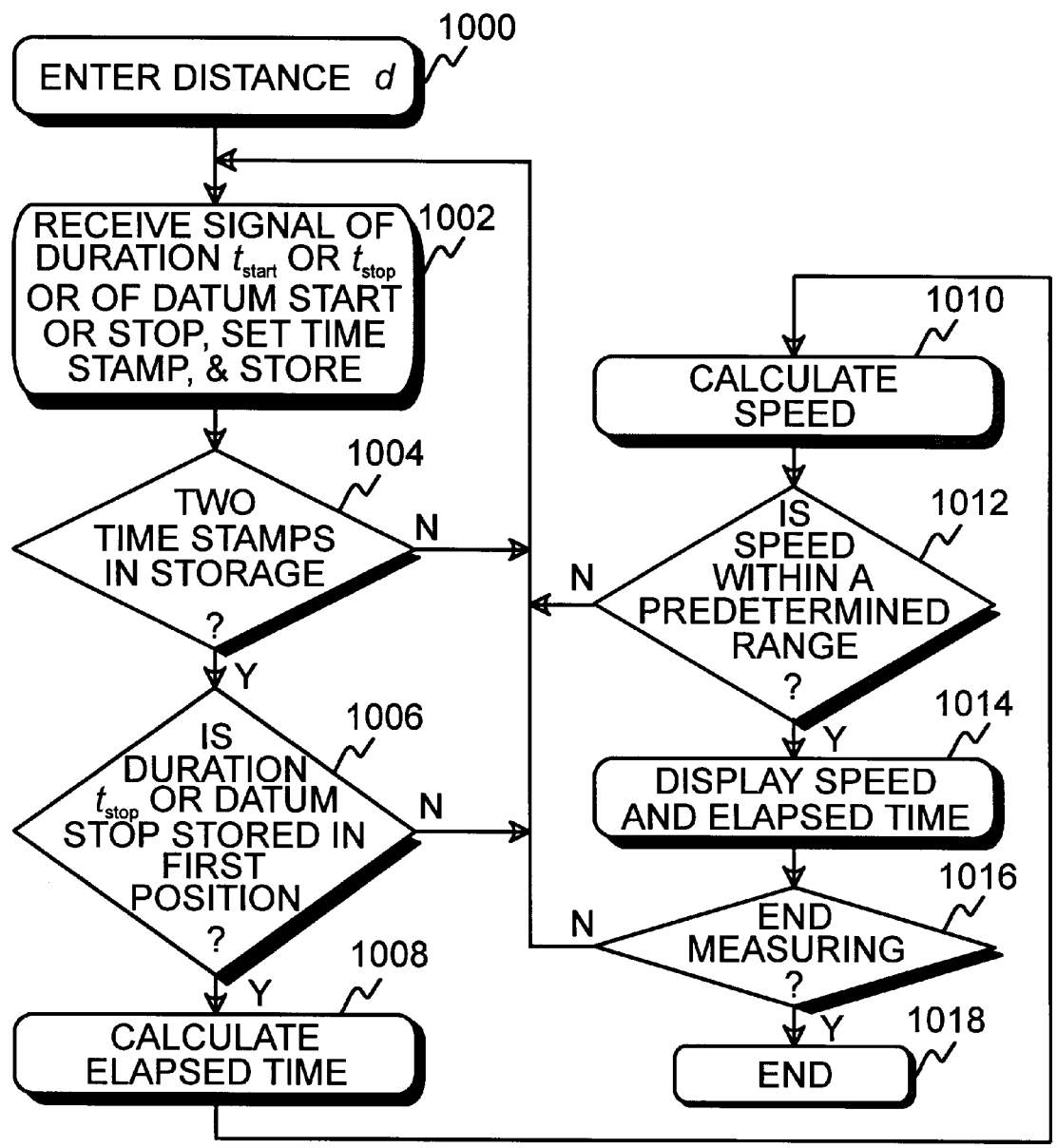
FIG. 10 shows a flowchart of an embodiment of the invention where a monitor unit receives a non-modulated or modulated radio transmission from an object unit of FIG. 9 indicating a start spin event or stop spin event.

FIG. 10 shows a flowchart of an embodiment of the invention where monitor unit 108 (FIG. 1) receives a non-modulated or modulated radio transmission from an object unit of FIG. 9 indicating a start spin event or stop spin event. Referring now to FIG. 10, the monitor unit 108 packaged with the object unit 100 (FIG. 1) in this embodiment is factory preset to recognize its mate by way of an identification code as well as a selected frequency. In step 1000 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 1002 radio receiver 110 (FIG. 1), which is tuned to the same frequency as radio transmitter 106 (FIG. 1), receives from radio transmitter 106 a non-modulated radio signal from FIG. 9 of duration $t_{start}$ or $t_{stop}$, or a modulated radio signal containing a datum indicating that the spin event marker is for a start spin event or a stop spin event. A time stamp is set and stored in a first position in monitor processor 112 (FIG. 1). Upon receiving the next spin event marker from radio transmitter 106, the time stamp in the first position is moved to a second position and the new spin event marker's time stamp is stored in the first position. Upon receipt of the next spin event marker, the time stamp in the first position is moved to the second position, overwriting the time stamp that was already there, and the most recent spin event marker's time stamp is stored in the first position. This queuing process is repeated each time a new spin event marker is received.

In step 1004 a check is made to determine if there are two time stamps in storage. If not, control returns to step 1002. If two time stamps are in storage, control passes to step 1006 which determines if the time stamp stored in the first position is of duration $t_{stop}$, or is a datum of a stop spin event. If not, control returns to step 1002. If yes, then in step 1008 the elapsed time of the spin event is determined by subtracting the time stamp stored in the second position from the time stamp stored in the first position. Then in step 1010 the distance d from step 1000 is divided by the elapsed time from step 1008 to determine the speed of the movable object. In step 1012 an optional check is made to determine if the speed falls within a predetermined range, such as 20–100 MPH for a baseball pitch. If not, control returns to step 1002 to receive the next radio signal spin event marker. If yes, step 1014 displays the speed in speed display 208 (FIG. 2) and the time of flight in time display 206 (FIG. 2). Control then passes to step 1016 to determine if measuring is to end. If not, control passes to step 1002. If yes, step 1018 ends the operation of the invention.

FIG. 11A shows a flowchart of an embodiment of the invention where object unit 100 (FIG. 1) transmits a modulated radio transmission containing a datum indicating the elapsed time between the start and end of a spin event. Spin is detected by utilizing one of the acceleration sensor networks described in FIG. 3 or FIGS. 4A or 4C.

Referring now to FIG. 11A, the description of steps 1100A through 1102A is the same as shown in FIG. 7 in corresponding steps 700 through 702. In step 1104A, a time stamp is set and stored in a first position in electronic processor circuit 104 (FIG. 1). Upon detecting the next spin event, the time stamp in the first position is moved to a second position and the new spin event's time stamp is stored in the first position. Upon receipt of the next spin event, the time stamp in the first position is moved to the second position, overwriting the time stamp that was already there, and the most recent spin event's time stamp is stored in the first position. This queuing process is repeated each time a new spin event is detected.

In step 1106A a stop spin event is detected. In step 1108A a time stamp is set and stored in electronic processor circuit 104. In step 1110A the elapsed time of the spin event is determined by subtracting the time stamp stored in the second position from the time stamp stored in the first position. Step 1112A then optionally determines if the elapsed time is within a predetermined time range. For the baseball pitching application, a reasonable elapsed time range would be 300 milliseconds to 1500 milliseconds, for example. If not, control returns to step 1102A. If yes, then in step 1114A a modulated radio signal containing a datum indicating the elapsed time is transmitted. In step 1116A, if another start spin event is detected before the predetermined shut-off time (typically one minute), then control returns to step 1102A. If not, control passes to step 1118A where object unit 100 is deactivated through its shut-off circuitry.

FIG. 11B shows a flowchart of a preferred embodiment of the invention where object unit 100 (FIG. 1) transmits a modulated radio transmission containing an identification code and a datum indicating the elapsed time between the start and end of a spin event. Spin is detected by utilizing one of the acceleration sensor networks described in FIG. 3 or FIGS. 4A or 4C.

In this embodiment of the invention, movable objects containing object unit 100 transmit an identification code. The identification code is different for each movable object as far as an X-bit code length will allow ($2^x$ different codes). A monitor unit will accept and use the motion data from any movable object for the first reception after monitor reset button 226 (FIG. 2) is pressed. After the first reception of motion data, the monitor unit stores the identification code received with the motion data. Thereafter, the monitor unit accepts transmissions only from movable objects using the same identification code. To use the monitor unit with a different movable object, the user must first press monitor reset button 226 on the monitor to clear the current identification code being stored. When the next motion data transmission is received, the monitor unit stores the identification code received with the motion data.

Referring now to FIG. 11B, the description of steps 1100B through 1112B are the same as shown in FIG. 11A in corresponding steps 1100A through 1112A. In step 1114B, a modulated radio signal containing an identification code and a datum indicating the elapsed time is transmitted. In step 1116B, if another start spin event is detected before the predetermined shut-off time (typically one minute), then control returns to step 1102B. If not, control passes to step 1118B where object unit 100 is deactivated through its shut-off circuitry.

FIG. 12A shows a flowchart of an embodiment of the invention where monitor unit 108 (FIG. 1) receives a modulated radio transmission from an object unit of FIG. 11A containing a datum indicating the elapsed time between the start and end of a spin event.

Referring now to FIG. 12A, in step 1200A the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 1202A radio receiver 110 (FIG. 1), which is tuned to the same frequency as radio transmitter 106 (FIG. 1), receives from radio transmitter 106 a modulated radio signal from FIG. 11A containing a datum indicating the elapsed time of a spin event. In step 1204A the distance d from step 1200A is divided by the elapsed time from step 1202A to determine the speed of the movable object. In step 1206A an optional check is made to determine if the speed falls within a predetermined range, such as 20–100 MPH for a baseball pitch. If not, control returns to step 1202A to receive the next signal. If yes, step 1208 displays the speed in speed display 208 (FIG. 2) and the time of flight in time display 206 (FIG. 2). Control then passes to step 1210A to determine if measuring is to end. If not, control passes to step 1202A. If yes, step 1212A ends the operation of the invention.

FIG. 12B shows a flowchart of an embodiment of the invention where monitor unit 108 (FIG. 1) receives a modulated radio transmission from the object unit from FIG. 11B containing an identification code and a datum indicating the elapsed time between the start and end of a spin event.

Referring now to FIG. 12B, in step 1200B the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 1201B radio receiver 110 (FIG. 1), which is tuned to the same frequency as radio transmitter 106 (FIG. 1), receives from radio transmitter 106 a modulated radio signal from FIG. 11B containing an identification code and a datum indicating the elapsed time of a spin event. Step 1203B determines if this is the first modulated radio signal containing motion data received since the last reset button down input, resulting from the user pressing reset button 226. If yes, then step 1207B stores the identification code in monitor processor 112 (FIG. 1). Control then passes to step 1209B.

If the determination in step 1203B is that the modulated radio signal received in step 1201B is not the first modulated radio signal containing motion data received since the last reset button down input, then step 1205B determines if the identification code contained in the modulated radio signal received in step 1201B matches the identification code stored in monitor processor 112. If not, control returns to step 1201B to receive the next modulated radio signal. If the answer in step 1205B is yes, then in step 1209B monitor processor 112 calculates flight characteristics from the motion data, and displays those flight characteristics in display 114 (FIG. 1). Step 1210B then determines if measuring is to end. If not, control passes to step 1201B. If yes, step 1212B ends the operation of the invention.

Figure 13A:
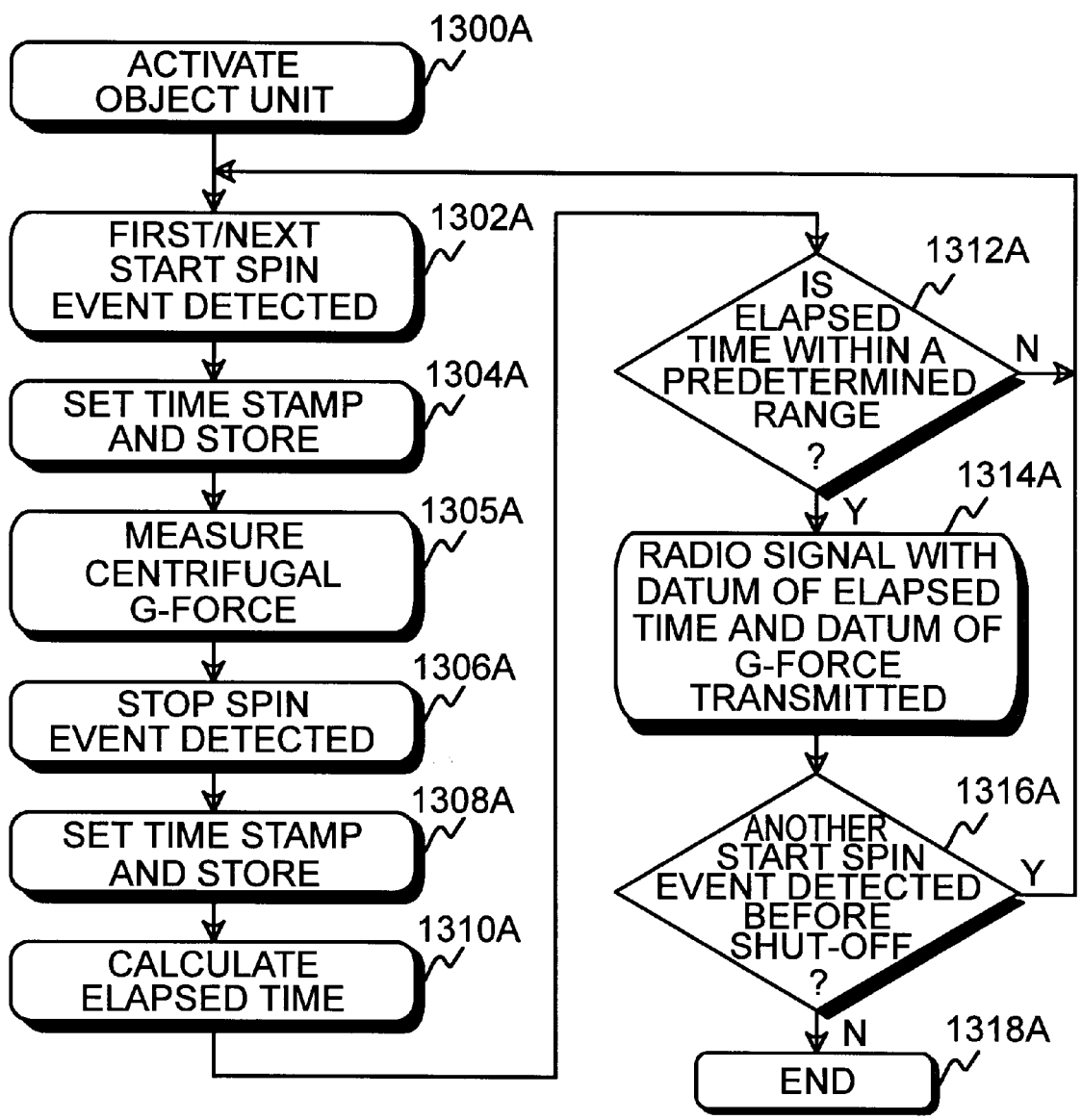
FIG. 13A shows a flowchart of an embodiment of the invention where an object unit transmits a modulated radio transmission containing a datum indicating the elapsed time between the start and end of a spin event and a datum representing the centrifugal g-force experienced by the acceleration sensors during the spin event.

FIG. 13A shows a flowchart of an embodiment of the invention where object unit 100 (FIG. 1) transmits a modulated radio transmission containing a datum indicating the elapsed time between the start and end of a spin event and a datum representing the centrifugal g-force experienced by the acceleration sensors during the spin event. Spin is detected by utilizing one of the acceleration sensor networks described in FIGS. 4A or 4C. Referring now to FIG. 13, the description of steps 1300A through 1304A is the same as shown in FIG. 11A in corresponding steps 1100A through 1104A. In step 1305A the centrifugal g-force is measured with acceleration sensor network 102 (FIG. 1). The description of steps 1306A through 1312A is the same as shown in FIG. 11A in corresponding steps 1106A through 1112A.

In step 1314A, a modulated radio signal containing a datum indicating the elapsed time and a datum indicating the centrifugal g-force experienced by acceleration sensor network 102 are transmitted. In step 1316A, if another start spin event is detected before the predetermined shut-off time (typically one minute), then control returns to step 1302A. If not, control passes to step 1318A where object unit 100 is deactivated through its shut-off circuitry.

Figure 13B:
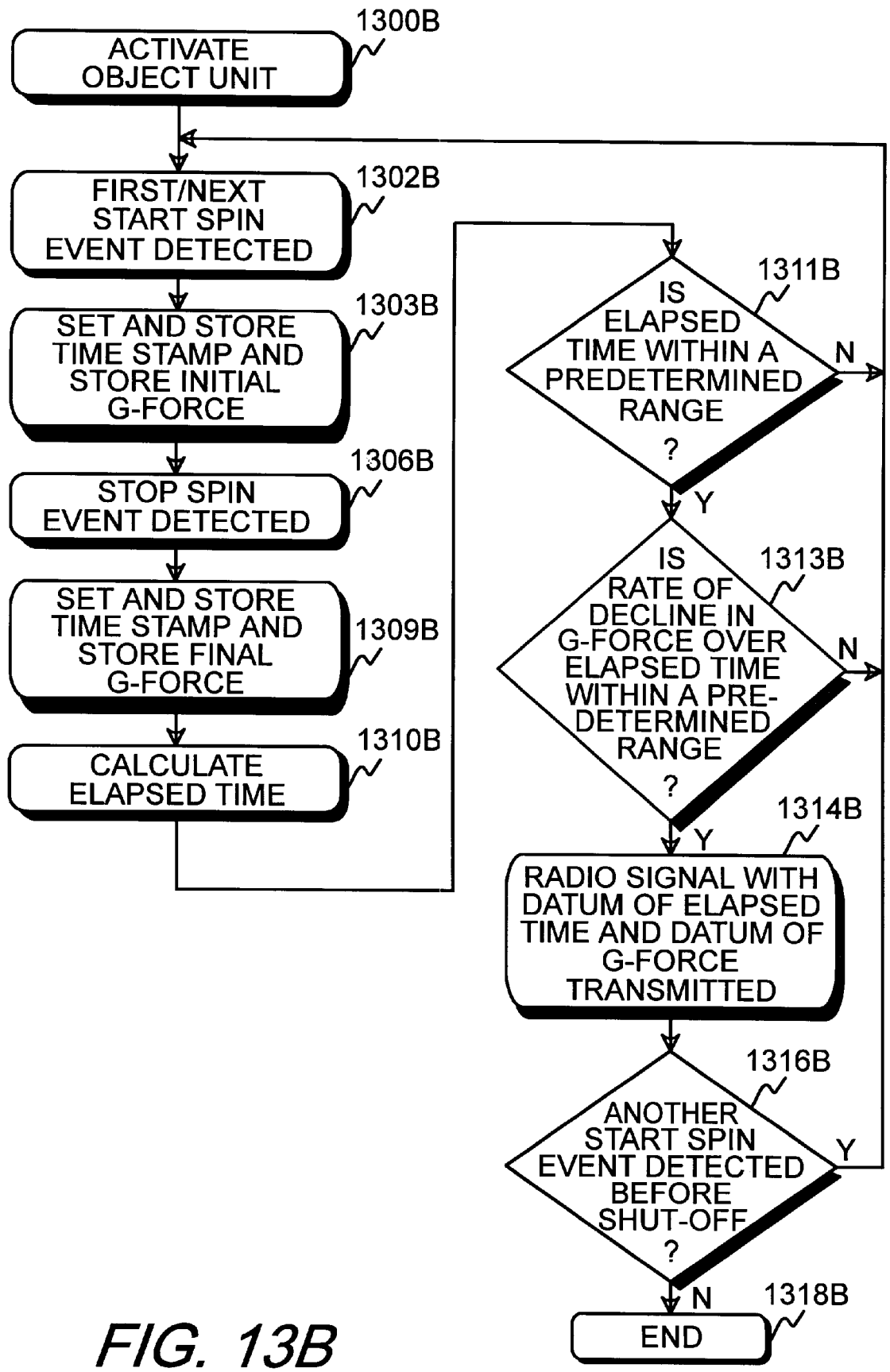
FIG. 13B shows a flowchart of an embodiment of the invention where an object unit uses a g-force filtering technique before transmitting a modulated radio transmission containing a datum indicating the elapsed time between the start and end of a spin event and a datum representing the centrifugal g-force experienced by the acceleration sensors during the spin event.

FIG. 13B shows a flowchart of an embodiment of the invention where object unit 100 (FIG. 1) uses a g-force filtering technique before transmitting a modulated radio transmission containing a datum indicating the elapsed time between the start and end of a spin event and a datum representing the centrifugal g-force experienced by the acceleration sensors during the spin event, or the spin rate if calculated within object unit 100. Spin is detected by utilizing the acceleration sensor network described in FIG. 4B, which could be positioned within a movable object such as a football. Referring now to FIG. 13B, the description of steps 1300B through 1302B is the same as shown in FIG. 13A in corresponding steps 1300A through 1302A.

In step 1303B, a time stamp is set when a g-force indicative of the typical spin rate of the movable object is detected, and is stored in a first position in electronic processor circuit 104 (FIG. 1). The initial g-force value measured by acceleration sensor network 102 (FIG. 1) is also stored. Upon detecting the next spin event, the time stamp in the first position is moved to a second position and the new spin event's time stamp is stored in the first position. Upon receipt of the next spin event, the time stamp in the first position is moved to the second position, overwriting the time stamp that was already there, and the most recent spin event's time stamp is stored in the first position. This queuing process is repeated each time a new spin event is detected.

In step 1306B a stop spin event is detected when the g-force measured is outside the range of values indicative of the typical spin rate of the movable object. In step 1309B a time stamp is set and stored in electronic processor circuit 104 and the final g-force measured by acceleration sensor network 102 just prior to the g-force falling outside the range of values indicative of the typical spin rate of the movable object is also stored. In step 1310B the elapsed time is calculated. The elapsed time of the spin event is determined by subtracting the time stamp stored in the second position from the time stamp stored in the first position. Step 1311B then determines if the elapsed time is within a predetermined range for the type of movable object containing object unit 100, such as a football. If not, control returns to step 1302B. If yes, then step 1313B determines if the g-force declined monitonicaly at a rate appropriate to the application. That is, a check is made to see that the centrifugal force continuously decreased between the start time and stop time of the spin event and that it decreased at a rate typical for the application, such as the typical decline in spin rate of a passed football. If the decline in g-force is not within the appropriate rate, control returns to step 1302B. If the decline in g-force is within the appropriate rate, then in step 1314B a modulated radio signal containing a datum indicating the elapsed time and a datum indicating the centrifugal g-force experienced by acceleration sensor network 102 are transmitted. In step 1316B, if another start spin event is detected before the predetermined shut-off time (typically one minute), then control returns to step 1302B. If not, control passes to step 1318B where object unit 100 is deactivated through its shut-off circuitry.

Figure 13C:
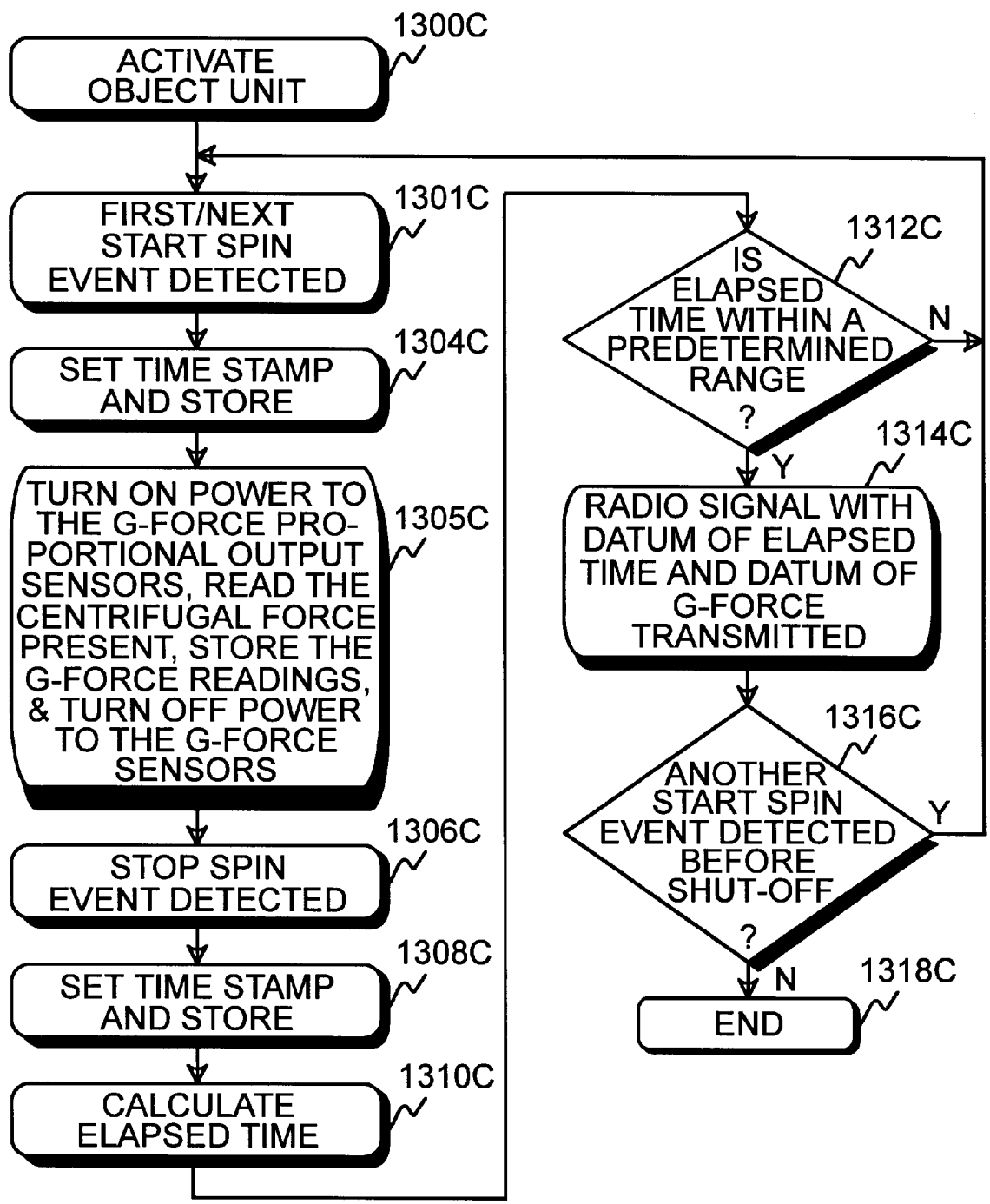
FIG. 13C shows a flowchart of a preferred embodiment of the invention where an object unit, using a power conserving technique, transmits a modulated radio transmission containing a datum indicating the elapsed time between the start and end of a spin event and a datum representing the centrifugal g-force experienced by the object unit during the spin event.

FIG. 13C shows a flowchart of a preferred embodiment of the invention where object unit 100 (FIG. 1), using a power conserving technique, transmits a modulated radio transmission containing a datum indicating the elapsed time between the start and end of a spin event and a datum representing the centrifugal g-force experienced by the object unit during the spin event. Spin is detected by utilizing the acceleration sensor network described in FIG. 4D. Referring now to FIG. 13C, in step 1300C object unit 100 (FIG. 1) is activated. In step 1301C a first or subsequent start spin event is detected by the mechanical g-force sensor switch network described in FIG. 4D.

In step 1304C, a time stamp is set and stored in a first position in electronic processor circuit 104 (FIG. 1). Upon detecting the next spin event, the time stamp in the first position is moved to a second position and the new spin event's time stamp is stored in the first position. Upon receipt of the next spin event, the time stamp in the first position is moved to the second position, overwriting the time stamp that was already there, and the most recent spin event's time stamp is stored in the first position. This queuing process is repeated each time a new spin event is detected.

In step 1305C, once spin has been detected (as described for the acceleration sensor network depicted in FIG. 3) by the mechanical g-force sensor switch network of FIG. 4D, electronic processor circuit 104 turns power on to the g-force proportional output sensors. A reading is taken from the g-force proportional output sensors of the centrifugal force present, and the data is stored in electronic processor circuit 104 (FIG. 1). Electronic processor circuit 104 then turns power off to the g-force proportional output sensors. The description of steps 1306C through 1312C are the same as shown in FIG. 11A in corresponding steps 1106A through 1112A.

In step 1314C, a modulated radio signal containing a datum indicating the elapsed time and a datum indicating the centrifugal g-force experienced by the g-force proportional output sensors, or a derived or calculated value such as spin rate, are transmitted. In step 1316C, if another start spin event is detected before the predetermined shut-off time (typically one minute), then control returns to step 1301C. If not, control passes to step 1318C where object unit 100 is deactivated through its shut-off circuitry.

Figure 14A:
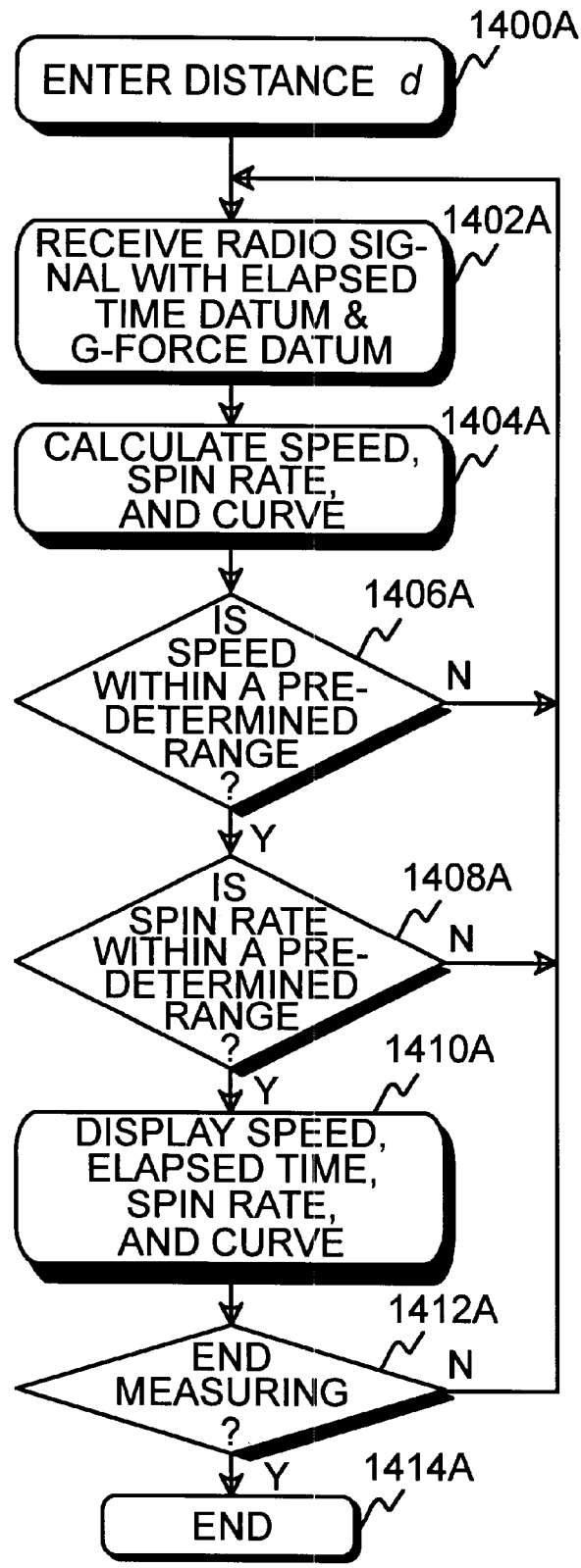
FIG. 14A shows a flowchart of an embodiment of the invention where a monitor unit receives from an object unit of FIG. 14A a modulated radio transmission containing a datum indicating the elapsed time between the start and end of a spin event and a datum representing the centrifugal g-force experienced by the acceleration sensors during the spin event.

FIG. 14A shows a flowchart of an embodiment of the invention where monitor unit 108 (FIG. 1) receives from radio transmitter 106 (FIG. 1) from the object unit of FIG. 14A a modulated radio transmission containing a datum indicating the elapsed time between the start and end of a spin event and a datum representing the centrifugal g-force experienced by the acceleration sensors during the spin event.

Referring now to FIG. 14A, in step 1400A the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In step 1402A radio receiver 110 (FIG. 1), which is tuned to the same frequency as radio transmitter 106 (FIG. 1), receives from radio transmitter 106 a modulated radio signal from FIGS. 13A, 13B, or 13C containing a datum indicating the elapsed time of a spin event and a datum representing the centrifugal g-force experienced by the acceleration sensors during the spin event. In step 1404A the distance d from step 1400A is divided by the elapsed time from step 1402A to determine the average speed of the movable object, and using the g-force datum, the spin rate of the movable object is calculated. The potential for lateral deflection of a movable object, like a baseball, is also calculated, and is referred to as the curve.

Lateral deflection is deflection of the movable object away from the path that the movable object would traverse in a vacuum. The lateral force that the air turbulence immediately surrounding a thrown spinning ball exerts on the ball is commonly referred to as the Magnus force or the Magnus effect. The potential for lateral deflection can be calculated by using a spinning ball's speed, spin rate, and distance covered statistics.

The lateral deflection that is calculated may not be realized by the pitcher as horizontal 'curve' since this requires an optimal orientation of the ball's axis of rotation with respect to the direction of flight. Hence, the use of the word "potential." For instance, the lateral deflection resulting from top spin causes a ball to sink faster toward the ground. The lateral deflection resulting from back spin causes a ball to resist dropping toward the ground.

The curve displayed on the monitor would be updated only when the speed and spin rate displays are updated, as described above. The curve may be expressed in inches of lateral deflection of the ball at the point at which the ball is caught. According to published sources, the deflection of a baseball due to Magnus force is given by the following equation:

$$d=KL^2\omega/2mV$$

where:
 d=deflection in meters
 k=a constant of $7\times10^{-5}$ kilograms
 L=the distance of the ball's flight in meters
 ω=rotation rate in radians/second, this is equal to $2\pi R$ where R is the spin rate
 m=mass of the ball in kilograms
 V=translational velocity of the ball in meters/second For a distance L of 59 feet (18 meters), a rotation rate of 1900 rpm (199 radians/second), a baseball of standard 5.125 ounces (0.145 kilograms), and an average translational velocity of 75 MPH (33.5 meters/second), the potential lateral deflection due to the Magnus force is 18.3 inches (0.46 meters). Of course, whether this lateral deflection will be realized depends on the orientation of the ball's axis of rotation with respect to the direction of flight. Using the same statistics except that the speed of the pitch is increased to a 'fast ball' of 90 MPH and the rotation rate is decreased to 1600 rpm, the potential lateral deflection is 12.8 inches (0.33 meters). This equation may be refined as further experimental results are obtained.

The derived potential lateral deflection can be converted into more useful information for the user if the relationship between the vectors describing the baseball's axis of rotation, the direction of flight, and gravity are known by electronic processor circuit 104 (FIG. 1) within the baseball. If the baseball houses a gyroscope, or some other gravity vector detection device, such that the gravity vector is known, the gravity vector can be compared to the axis of rotation vector. The direction of flight vector with respect to the axis of rotation vector can be calculated by using the accelerometers' outputs during the translational acceleration that occurs at the instant before the pitcher releases the ball (or, more precisely, before the pitcher begins spinning the ball). Such a sophisticated baseball/monitor system could display to the user the direction of lateral deflection as well as the magnitude of that deflection. For example, it could tell the user that the pitch had a top spin that caused a fast sinking ball with a Magnus force induced deflection of 12 inches.

Since the amount of lateral deflection can be influenced by the barometric pressure, temperature, and humidity levels, a more accurate estimate of the potential for curve is possible if the monitor unit uses these variables in determining the curve. The monitor unit could prompt the user for this data or could directly measure these variables via built in sensors. The curve is expressed in inches or centimeters of lateral deflection of the ball at the point at which the ball is caught.

In step 1406A an optional check is made to determine if the speed falls within a predetermined range, such as 20–100 MPH for a baseball pitch. If not, control returns to step 1402A to receive the next signal. If yes, step 1408A an optional check is made to determine if the spin rate falls within a predetermined spin rate range. For a baseball application, an acceptable spin rate range might be between 0.5 and 40 revolutions/second. If the spin rate does not fall within the predetermined range, control returns to step 1402A. If it does, then step 1410A displays the speed in speed display 208 (FIG. 2), the time of flight in time display 206 (FIG. 2), the spin rate in spin rate display 218 (FIG. 2), and the curve in curve display 216. Control then passes to step 1412A to determine if measuring is to end. If not, control passes to step 1402A. If yes, step 1414A ends the operation of the invention.

For spinning objects in which the axis of rotation varies and for which centrifugal g-force readings from multiple sensors are available, the orientation of the axis of rotation with respect to the position of the g-force sensors can be deduced. For the example of a pitched baseball, the orientation of a surface feature, such as the seams of the baseball's leather covering, with respect to the centrifugal g-force sensors can be known. This information can be used to provide the pitcher or coach with a graphical depiction of the orientation of the ball's seams with respect to the direction of rotation or the axis of rotation for each pitch.

For a pitched baseball, the axis of rotation is constrained only to pass through the center of the ball, hence 3 centrifugal g-force sensors along 3 non-coplanar radii are required to accurately deduce the axis of rotation with respect to the sensors and leather seams. Sensor 1 must be oriented to sense g-forces normal to the g-force vectors sensed by sensor 2. Sensor 3 must be oriented to sense g-forces normal to the plane formed by the g-force vectors sensed by sensors 1 and 2. Knowing the position of each sensor and the relative strength of each g-force reading when the ball is spinning, the orientation of the axis of rotation with respect to the position of the sensors can be deduced using standard trigonometric or empirically derived relationships.

In the example of a baseball with 3 centrifugal g-force sensors sensing along 3 orthogonal axes X, Y, and Z through the center of the ball, relative g-force readings of 0, 1, and 1, respectively, would be indicative of an axis of rotation coincident with the X axis. Relative readings of 1, 1, and 1, respectively, would be indicative of an axis of rotation that forms equal angles with the X, Y, and Z-axes. For these simple cases, the orientation of the axis of rotation is easily deduced; however, for most other measured readings, standard trigonometric or empirically derived relationships must be used to determine the orientation.

For a spinning object unit in which the axis of rotation is constrained to be in a known plane, only 2 centrifugal g-force sensors are required to accurately deduce the axis of rotation. Sensor 1 must sense g-forces normal to the g-force vectors sensed by sensor 2.

When the monitor unit couples information about the speed of spin rate with the seam orientation of a pitched baseball, the type of pitch can be deduced. For example, the derived axis of rotation for a professional pitcher's toss may be consistent with a 4-seam fastball or a curveball. However, if the time of flight information indicates that the toss was 92 MPH, it is reasonable to assume that the toss was a 4-seam fastball rather that a curve, since curveballs are typically 10 MPH slower than fast balls. Calculating the spin rate of each pitch and knowing the typical spin rates for various pitches can enhance the accuracy of deducing the type of pitch thrown.

Figure 14B:
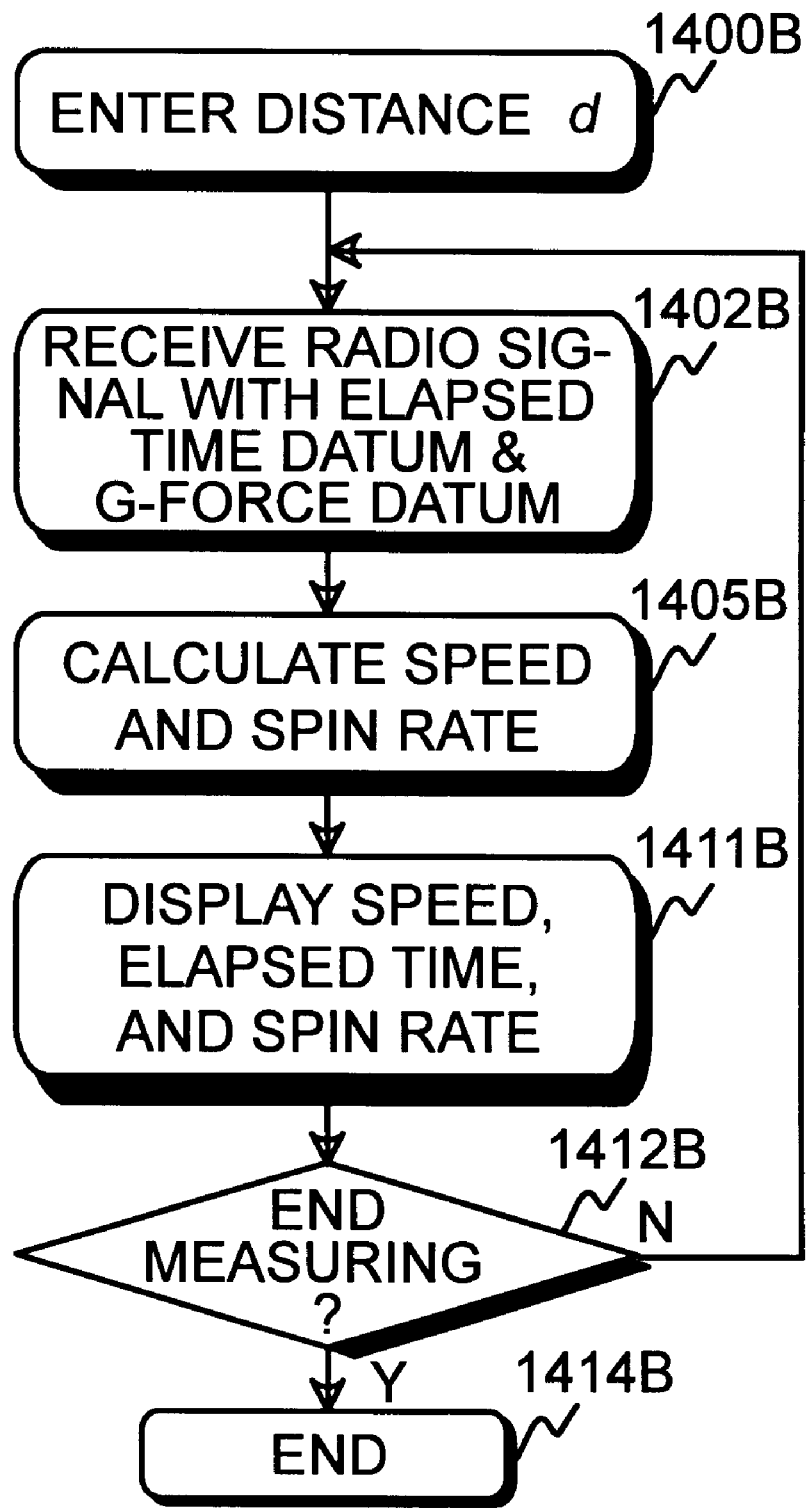
FIG. 14B shows a flowchart of an embodiment of the invention where a monitor unit receives from the object unit of FIG. 13B or FIG. 13C a modulated radio transmission containing a datum indicating the elapsed time between the start and end of a spin event and a datum representing the centrifugal g-force experienced by the acceleration sensors during the spin event.

FIG. 14B shows a flowchart of an embodiment of the invention where monitor unit 108 (FIG. 1) receives from radio transmitter 106 (FIG. 1) from the object unit of FIG. 13B or FIG. 13C a modulated radio transmission containing a datum indicating the elapsed time between the start and end of a spin event and a datum representing the centrifugal g-force experienced by the acceleration sensors during the spin event.

Referring now to FIG. 14B, in step 1400B the user enters through numeric keypad 202 (FIG. 2) the distance d between two points where characteristics of the movable object containing object unit 100 (FIG. 1) are desired to be measured.

In step 1402B radio receiver 110 (FIG. 1), which is tuned to the same frequency as radio transmitter 106 (FIG. 1), receives from radio transmitter 106 a modulated radio signal from FIG. 13B containing a datum indicating the elapsed time of a spin event and a datum representing the centrifugal g-force experienced by acceleration sensor network 102 during the spin event. In step 1405B the distance d from step 1400B is divided by the elapsed time from step 1402B to determine the speed of the movable object, and using the g-force datum, the spin rate of the movable object is calculated.

Step 1411B displays the speed in speed display 208, the time of flight in time display 206, and the spin rate in spin rate display 218 (FIG. 2). Control then passes to step 1412B to determine if measuring is to end. If not, control passes to step 1402B. If yes, step 1414B ends the operation of the invention.

Figure 15:
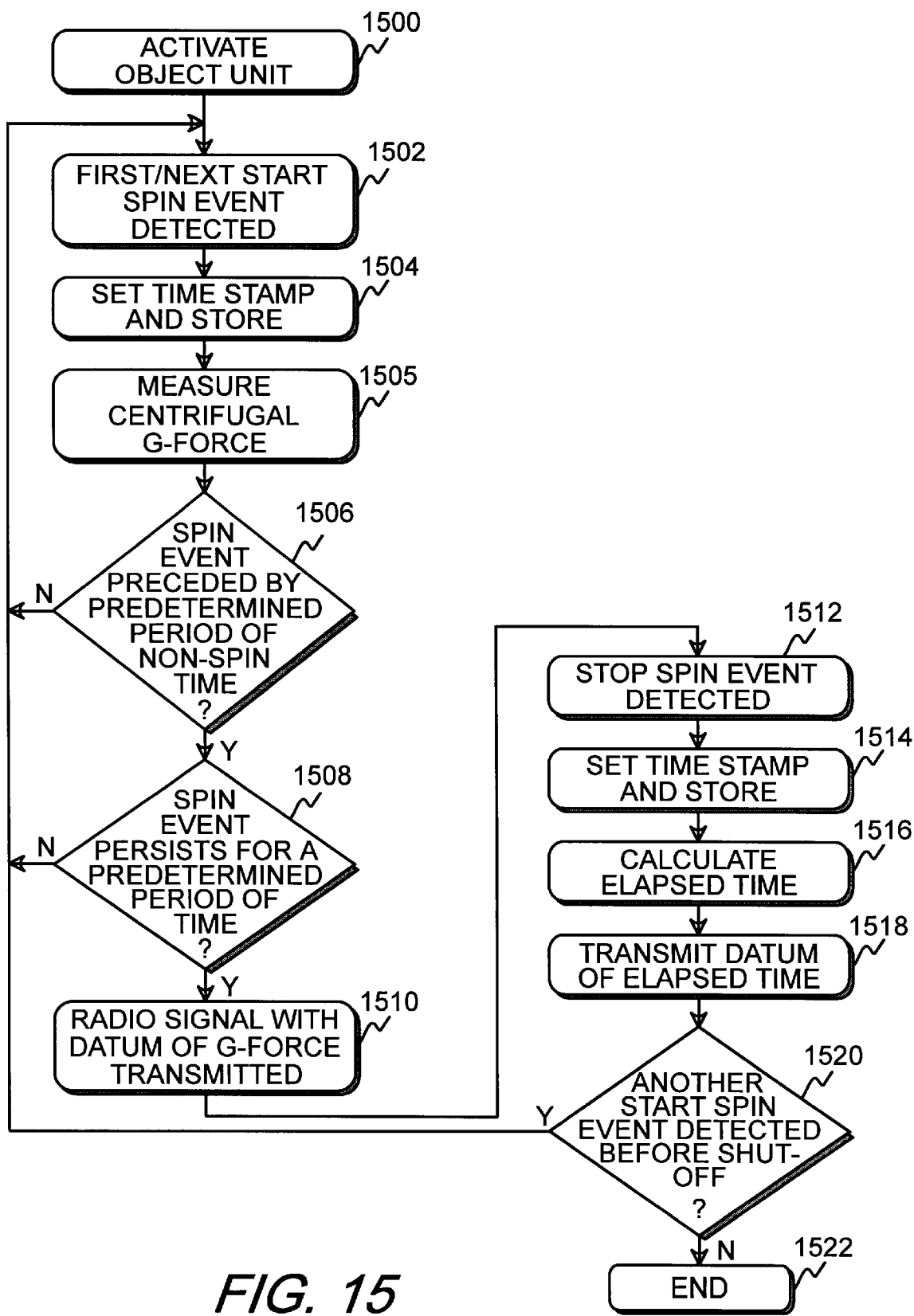
FIG. 15 shows a flowchart of an embodiment of the invention where an object unit transmits a modulated radio transmission containing a datum indicating the centrifugal g-force experienced by the acceleration sensors during a spin event as soon as the g-force data is known.

FIG. 15 shows a flowchart of an embodiment of the invention where object unit 100 (FIG. 1) transmits a modulated radio transmission containing a datum indicating the centrifugal g-force experienced by the acceleration sensors during a spin event as soon as the g-force data is known. Spin is detected by utilizing one of the acceleration sensor networks described in FIGS. 4A, 4C, 4D, or 4E. Referring now to FIG. 15, in step 1500 object unit 100 is activated. In step 1502 a first or subsequent start spin event is detected by acceleration sensor network 102 (FIG. 1).

In step 1504, a time stamp is set and stored in a first position in electronic processor circuit 104 (FIG. 1). Upon detecting the next spin event, the time stamp in the first position is moved to a second position and the new spin event's time stamp is stored in the first position. Upon receipt of the next spin event, the time stamp in the first position is moved to the second position, overwriting the time stamp that was already there, and the most recent spin event's time stamp is stored in the first position. This queuing process is repeated each time a new spin event is detected.

In step 1505 the centrifugal g-force is measured with acceleration sensor network 102 (FIG. 1). One skilled in the art will recognize that for the acceleration sensor network described in FIG. 4D, the step 1305C (FIG. 13C) would have to be performed in stead of step 1505. In step 1506, electronic processor circuit 104 determines if the spin event detected in step 1502 was preceded by a predetermined period of non-spin time. The predetermined period of non-spin time may vary depending upon the type of movable object the object unit 100 is embedded within. Typically, the predetermined period of time would be several seconds. This is to filter out (ignore) spin events that are not of interest. For example, if there were no requirement for two seconds of non-spin time, then a soccer ball that strikes a net, and stops spinning for ¼ of a second before it stats spinning again when it falls from the net, would transmit again.

If step 1506 determines that the spin event was not preceded by the predetermined period of non-spin time, control returns to step 1502. If step 1506 determines that the spin event was preceded by the predetermined period of non-spin time, then in step 1508 acceleration sensor network 102 determines if the spin event persisted for a predetermined period of spin time. Typically, the predetermined period of spin time would be in the tens of milliseconds to hundreds of milliseconds range. If the spin event did not persist for the predetermined period of spin time, then control returns to step 1502. If step 1508 determines that the spin event did persist for the predetermined period of spin time, then in step 1510 a modulated radio signal containing a datum representing the centrifugal g-force measured by acceleration sensor network 102 in step 1505 is transmitted by radio transmitter 106 (FIG. 1).

In step 1512 a stop spin event is detected by acceleration sensor network 102. In step 1514 a time stamp is set and stored in electronic processor circuit 104. In step 1516 the elapsed time of the spin event is determined by subtracting the time stamp stored in the second position from the time stamp stored in the first position. In step 1518 a modulated radio signal containing a datum indicating the elapsed time of object unit 100 is transmitted by radio transmitter 106. Step 1520 then determines if another start spin event is detected before the predetermined shut-off time (typically one minute). If yes, then control returns to step 1502. If not, control passes to step 1522 where object unit 100 is deactivated through its shut-off circuitry. For an embodiment of the invention where only spin rate is desired and not speed, steps 1514 through 1518 would not have to be performed.

Figure 16:
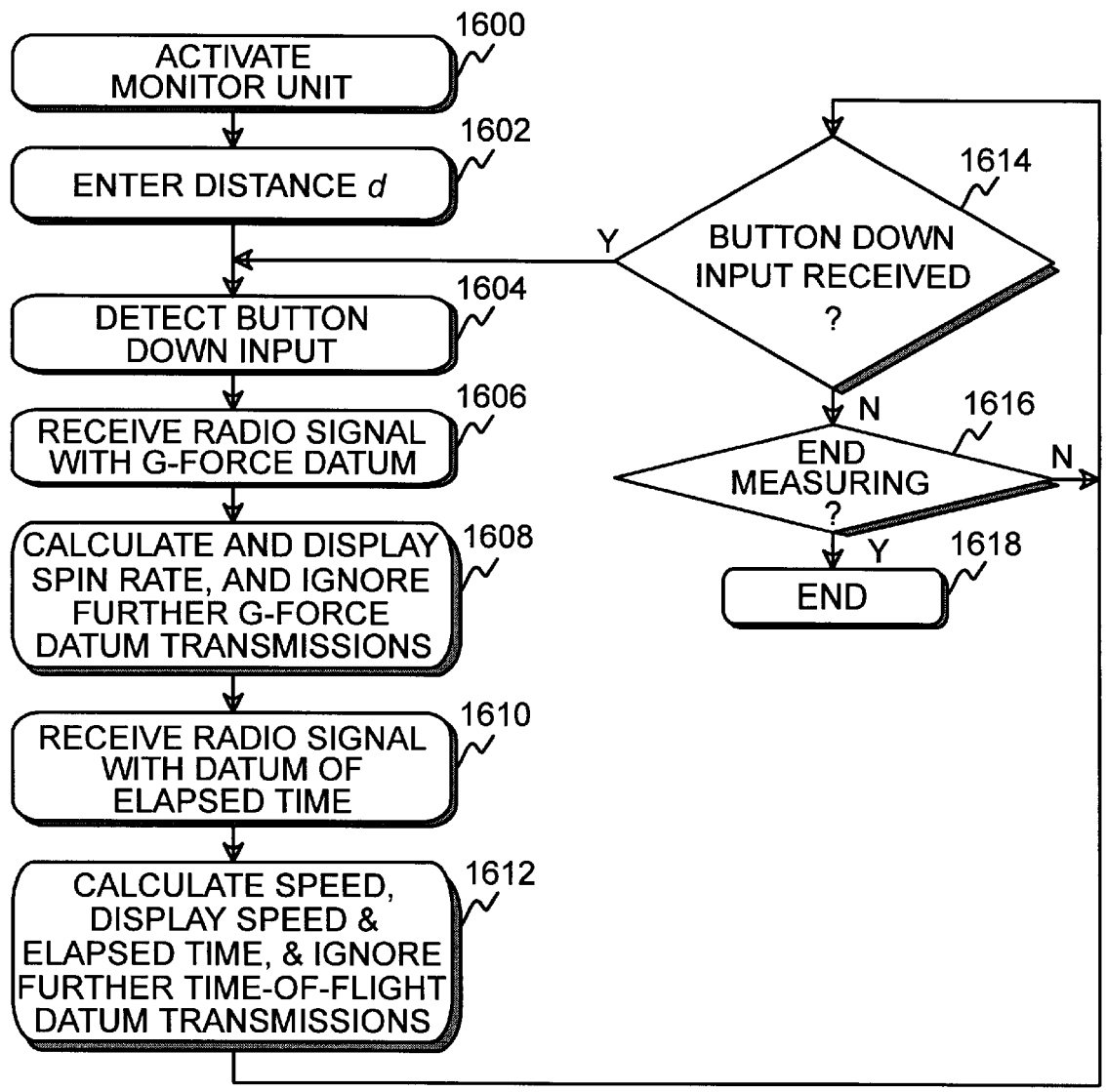
FIG. 16 shows a flowchart of an embodiment of the invention where a monitor unit receives from an object unit a modulated radio transmission containing a datum indicating the centrifugal g-force measured by acceleration sensor network during a spin event of the object unit as soon as the g-force data is known.

FIG. 16 shows a flowchart of an embodiment of the invention where monitor unit 108 (FIG. 1) receives from object unit 100 (FIG. 1) a modulated radio transmission containing a datum indicating the centrifugal g-force measured by acceleration sensor network 102 (FIG. 1) during a spin event of object unit 100 as soon as the g-force data is known.

Referring now to FIG. 16, in step 1600 the user activates monitor unit 108. In step 1602, the user enters through numeric keypad 202 (FIG. 2) the distance d between two points where characteristics of the movable object containing object unit 100 (FIG. 1) are desired to be measured. In step 1604 monitor processor 112 detects measure and hold next toss button down input from measure and hold next toss button 212 (FIG. 2) located on keypad 116 (FIG. 1). In different embodiments of the invention, depending upon the type of movable object, the label for button 212 may be different, such as measure and hold next kick button 212 for a soccer ball, or measure and hold next slap shot button 212 for a hockey puck. In step 1606, radio receiver 110 (FIG. 1), which is tuned to the same frequency as radio transmitter 106 (FIG. 1), receives from radio transmitter 106 a modulated radio signal from step 1510 of FIG. 15 containing a datum indicating the measured centrifugal g-force experienced by acceleration sensor network 102. In step 1608, using the g-force datum, the spin rate of the movable object is calculated and displayed on output display 114. Monitor unit 108 will now ignore and discard any further g-force datum transmissions from object unit 100 until measure and hold next toss button 212 is pressed again.

In step 1610 radio receiver 110 receives from radio transmitter 106 a modulated radio signal from step 1518 of FIG. 15 containing a datum indicating the elapsed time of object unit 100. In step 1612 the distance d from step 1602 is divided by the elapsed time from step 1610 to determine the speed of the movable object, and is displayed on output display 114 (FIG. 1) along with the elapsed time. Monitor unit 108 will now ignore and discard any further elapsed time datum transmissions from object unit 100 until measure and hold next toss button 212 is pressed again.

Step 1614 determines if measure and hold next toss button down input is detected. If yes, control returns to step 1604. If measure and hold next toss button down input is not detected in step 1614, then step 1616 determines if measuring is to end. If not, control returns to step 1614. If yes, step 1618 ends the operation of the invention.

Figure 17:
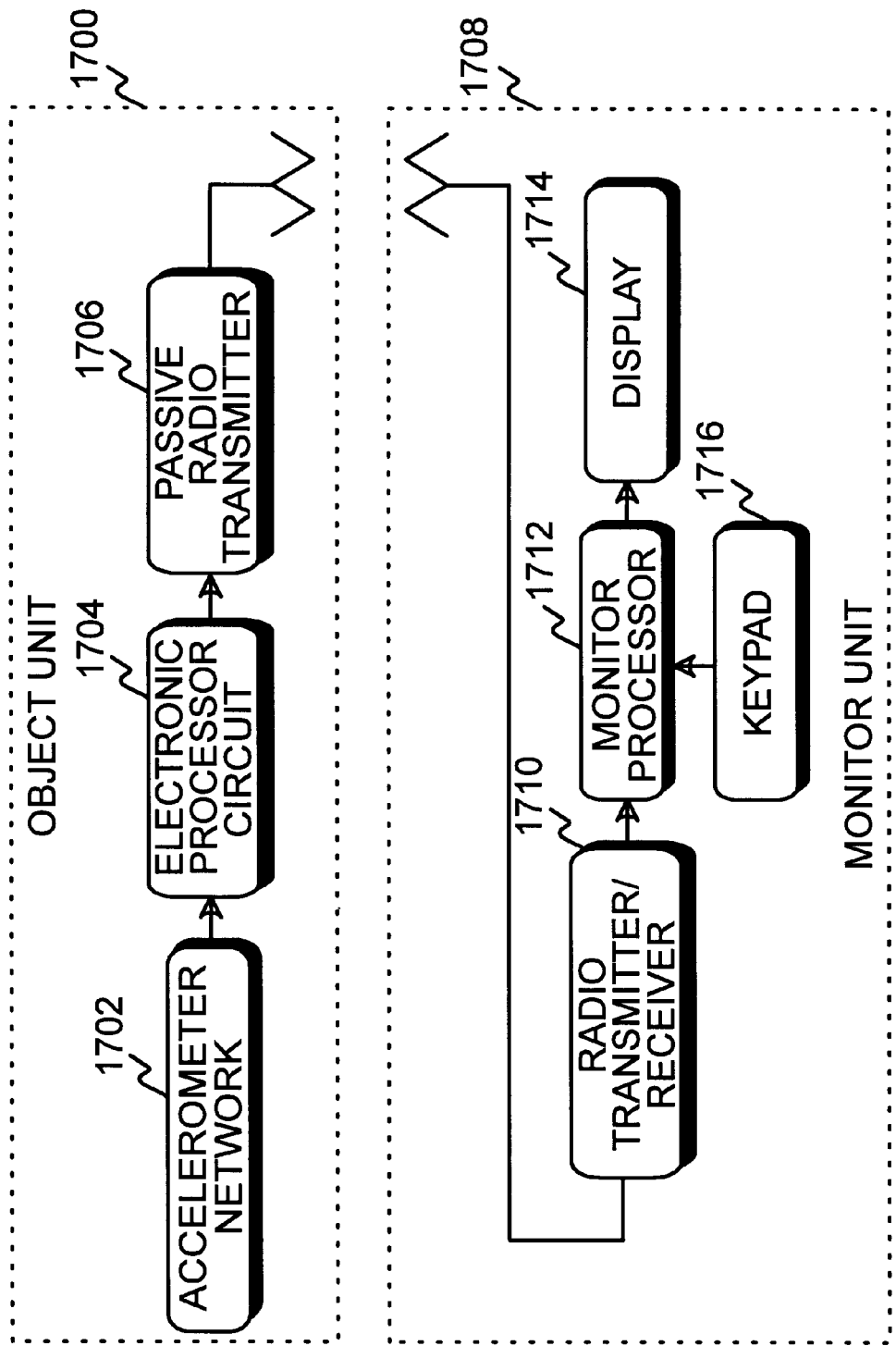
FIG. 17 shows a block diagram of another embodiment of a device for measuring the speed, spin rate, and curve of a movable object of the present invention using a modulated backscatter radio transmission technique.

FIG. 17 shows a block diagram of another embodiment of a device for measuring speed, spin rate, and curve of a movable object of the present invention using a modulated backscatter radio transmission technique. Referring now to FIG. 17, the invention comprises two main parts: object unit 1700 and monitor unit 1708. The intent of the invention is to provide the user with statistics about the trajectory of a spinning movable object. Object unit 1700 has an acceleration sensor network 1702 that communicates through an electronic processor circuit 1704 to a passive radio transmitter 1706. Acceleration sensor network 1702, embedded along with the other components of object unit 1700 within or attached to a movable object, detects centrifugal force, that is, acceleration generated by rotation about an axis.

Monitor unit 1708 has a radio transmitter/receiver 1710 that communicates with a monitor processor 1712. An input keypad 1716 inputs information to monitor processor 1712, and monitor processor 1712 sends information to an output display 1714. Object unit 1700 communicates with monitor unit 1708 through passive radio transmitter 1706 and radio transmitter/receiver 1710. Radio transmitter/receiver 1710 emits a continuous radio frequency sine wave. Passive radio transmitter 1706 is powered by the electromagnetic energy in radio transmitter/receiver 1710's transmissions. Object unit 1700 reflects back the transmissions from monitor unit 1708 and modulates the signal with elapsed time, g-force data, and identification code. This technique, referred to as modulated backscatter, is commonly used with Radio Frequency Identification (RFID) devices.

It is not practical to have monitor unit 1708 always transmitting a continuous wave so that object unit 1700 can piggy back motion data on it whenever a spin event occurs. Therefore, monitor unit 1708 may be designed to periodically poll object unit 1700 for motion data, or initiate a polling event in response to a user's request (button press) command to update the display data. For example, monitor unit 1708 may poll object unit 1700 for new motion data once every 2 seconds. If new motion data exists, object unit 1700 will transmit that information; otherwise, no motion data is sent. Once monitor unit 1708 receives the back scattered transmission, the derived statistics are calculated and displayed as described in previous embodiments. In previous embodiments, during a spin event or immediately following a valid spin event, object unit 1700 transmitted information to monitor unit 1708. In this embodiment, instead of transmitting the motion data, monitor processor 1712 must load passive radio transmitter 1706 with the motion data to be sent so that it can be relayed to monitor unit 1708 at the next polling.

Monitor unit 1708 in this embodiment can operate in an environment in which there are multiple object units. Commonly available modulated backscatter systems support collision avoidance and collision recovery protocols to handle the case in which multiple object units sense monitor unit 1708's polling and could possibly respond at the same instant. In one collision avoidance technique, monitor unit 1708 transmits the identification code of the object unit it wishes to poll before generating the continuous radio frequency sine wave on which the response will ride. The object unit within transmission range that detects its own identification code will respond to the poll.

Figure 18:
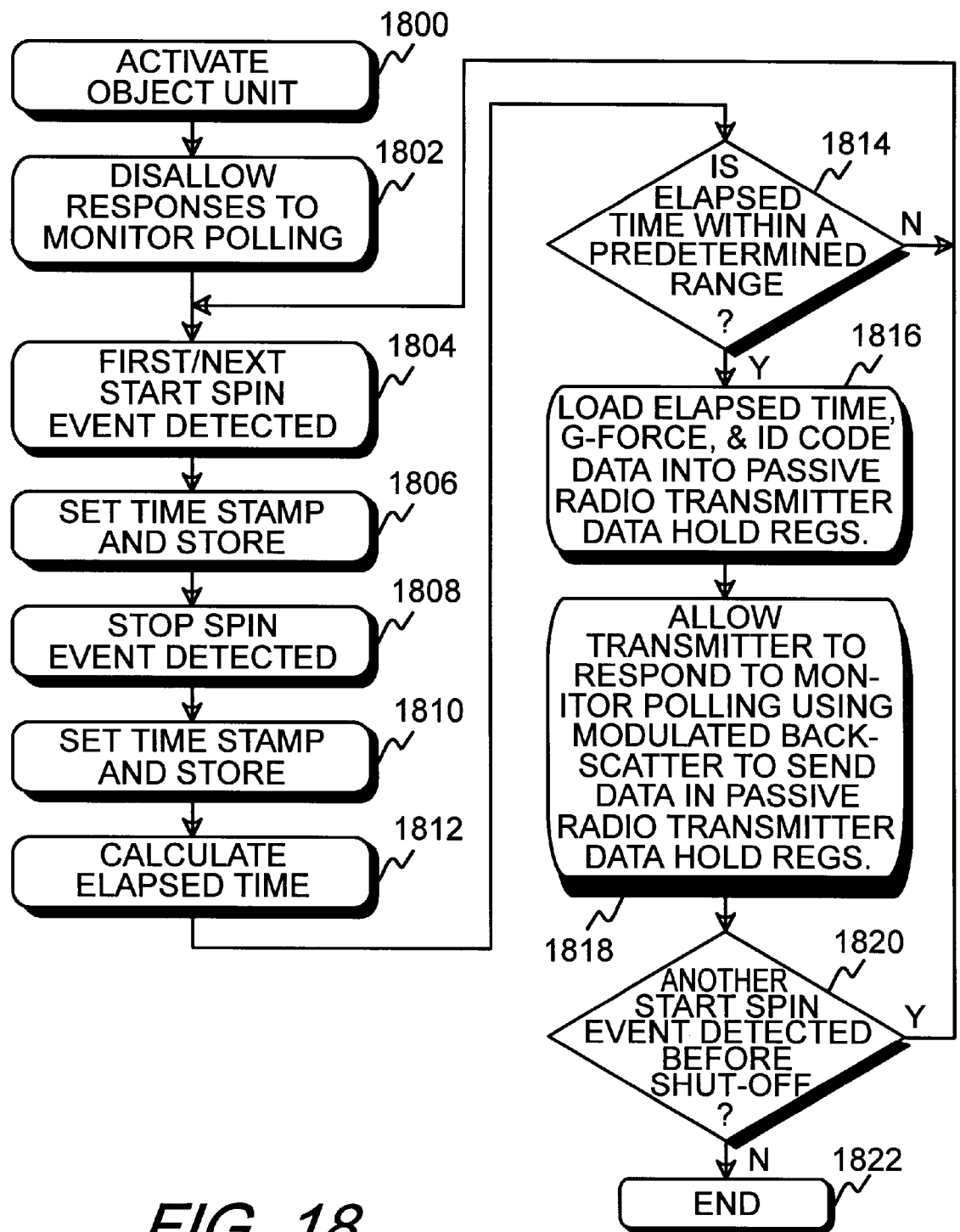
FIG. 18 shows a flowchart of an object unit using a modulated backscatter radio transmission technique for indicating elapsed time between the start and end of spin and g-force level by the object unit in response to monitor unit polling.

FIG. 18 shows a flowchart of the object unit of FIG. 17 using a modulated backscatter radio transmission technique for indicating elapsed time between the start and end of spin and g-force level by the object unit in response to monitor unit polling. Spin, g-force data, and identification code are transferred from the object unit to the monitor unit only when the monitor unit polls for the motion data and the object unit has new motion data to send. Spin is detected by utilizing one of the acceleration sensor networks described in FIGS. 4A, 4B, 4C, 4D, or 4E.

Referring now to FIG. 18, in step 1800 object unit 1700 (FIG. 17) is activated. In step 1802, object unit 1700 disallows passive radio transmitter 1706 (FIG. 17) from responding to polls by monitor unit 1708 (FIG. 17). The description of steps 1804 through 1812 is the same as shown in FIG. 11A in corresponding steps 1102A through 111A.

In step 1814, if the calculated elapsed time is not within a predetermined range, control returns to step 1804. If the elapsed time does fall within a predetermined range, then in step 1816 the spin, g-force data, and identification code is loaded into passive radio transmitter 1706's data hold register. In step 1818, passive radio transmitter 1706 is enabled, allowing it to respond to the next poll by monitor unit 1708. In step 1820, if another start spin event is detected before the predetermined shut-off time (typically one minute), then control returns to step 1804. If not, control passes to step 1822 where object unit 1700 is deactivated through its shut-off circuitry. One skilled in the art will recognize that a new spin event may occur before the poll by monitor unit 1708 occurs, in which case the motion data being held in passive radio transmitter 1706's data hold register may be overwritten before ever being transferred to monitor unit 1708.

Figure 19:
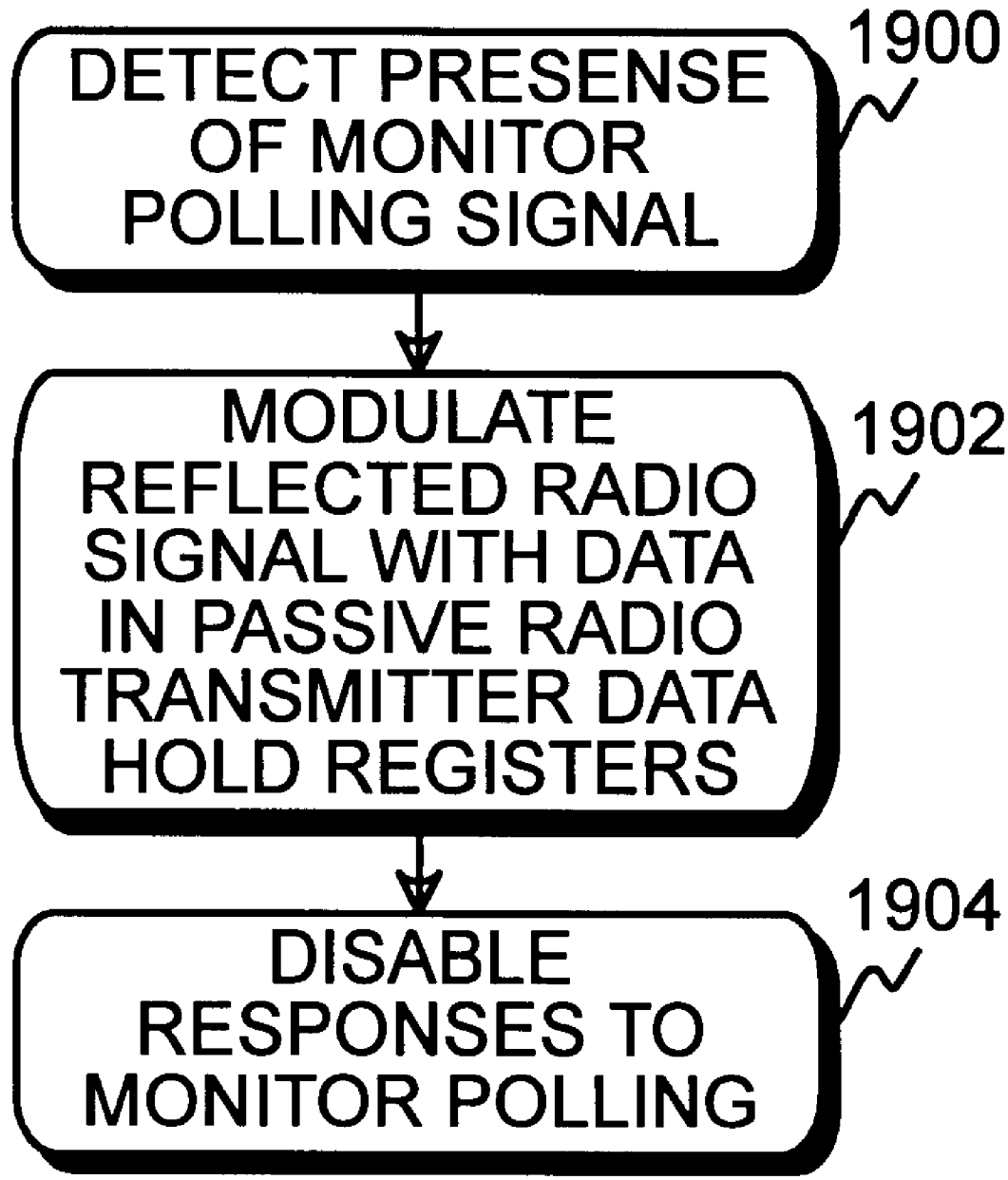
FIG. 19 shows a flowchart of the response by the object unit of FIG. 17 to monitor unit polling for the embodiment of the invention which uses a modulated backscatter radio transmission technique.

FIG. 19 shows a flowchart of the response by the object unit of FIG. 17 to monitor unit polling for the embodiment of the invention which uses a modulated backscatter radio transmission technique.

Referring now to FIG. 19, once passive radio transmitter 1706 (FIG. 17) of object unit 1700 is enabled in step 1818 (FIG. 18), in step 1900 object unit 1700 watches for the presence of monitor unit 1708's radio frequency transmission. When the radio frequency transmission is detected, in step 1902 passive radio transmitter 1706 modulates the signal that its antenna is reflecting with the motion data held in passive radio transmitter 1706's data hold register. Anti-collision protocols may be applied at this stage to gracefully recover from the case in which two object units respond simultaneously to the same monitor unit poll. Once done transmitting, in step 1904 passive radio transmitter 1706 is disabled and is not enabled again until in step 1818 (FIG. 18) after new motion data arrives in step 1816 (FIG. 18).

Figure 20:
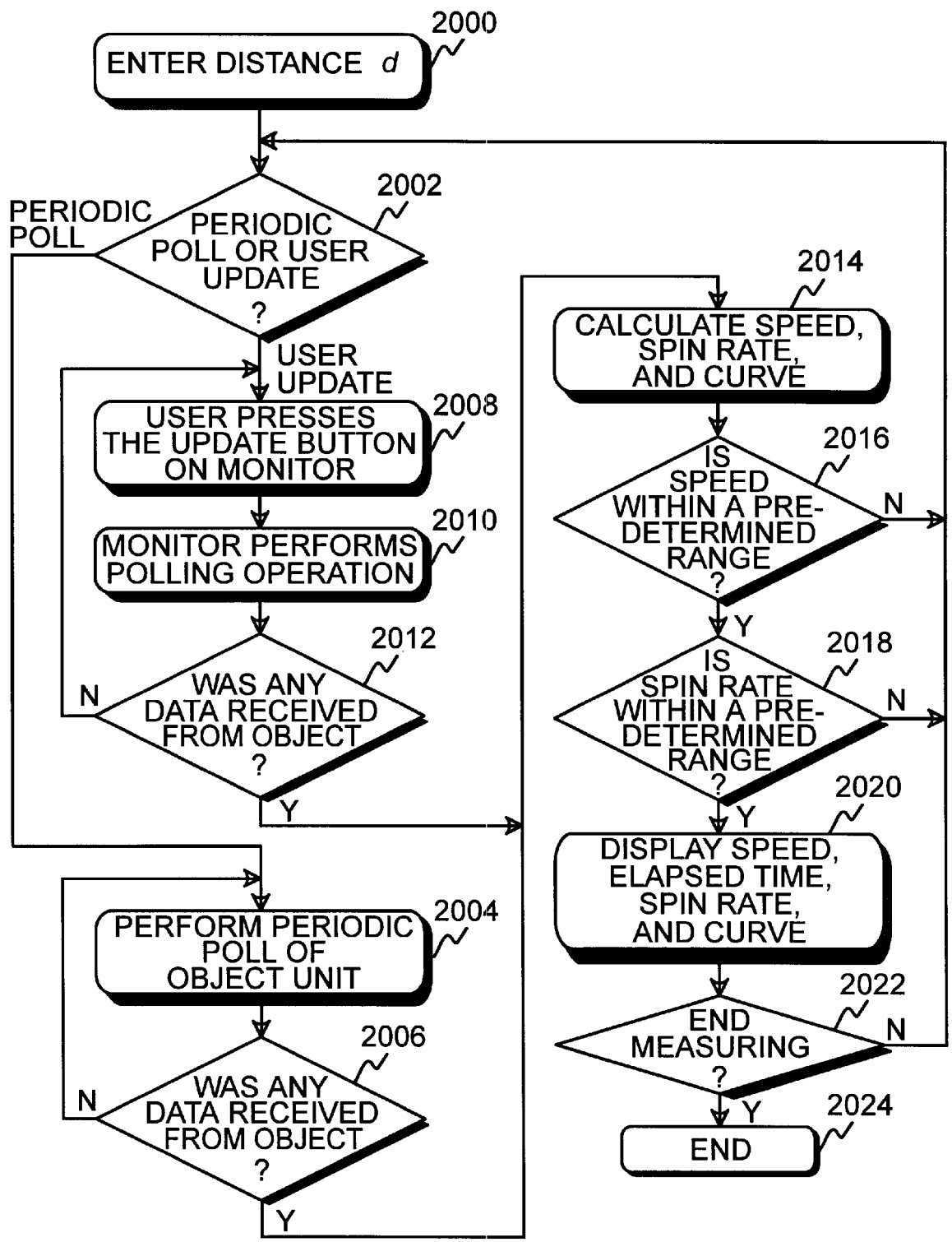
FIG. 20 shows a flowchart of a monitor unit using periodic basis or user initiated polling for the embodiment of the invention which uses modulated backscatter radio transmissions.

FIG. 20 shows a flowchart of monitor unit 1708 (FIG. 17) using periodic basis or user initiated polling for the embodiment of the invention which uses a modulated backscatter radio transmission technique.

Referring now to FIG. 20, in step 2000 the user enters through numeric keypad 202 (FIG. 2) the distance d between two points where characteristics of the movable object containing object unit 1700 (FIG. 17) are desired to be measured. For a baseball pitch, the distance between the pitcher and catcher would be entered. Step 2002 determines if the user wants to poll object unit 1700 manually by pressing an update button on monitor unit 1708, or if the user wants monitor unit 1708 to periodically poll object unit 1700. In the latter case, control passes to step 2004 where monitor unit 1708 initiates a periodic basis poll, once every two seconds for example. In step 2004, monitor unit 1708 continuously generates an RF sine wave during the polling period and watches for modulation to occur. Detected modulation of the field indicates the presence of object unit 1700 transmitting spin, g-force data, and identification code. Monitor unit 1708 may employ collision avoidance or collision recovery protocols for the case in which multiple object units are within its transmission range. In step 2006, if no motion data is returned during the polling period, control returns to step 2004 to wait the poll interval (two seconds, for example) before repeating the process. If motion data is returned, then control passes to step 2014.

If in step 2002 the user wants to poll object unit 1700 manually, control passes to step 2008 where the user initiates a poll by pressing update button 224 (FIG. 2) on keypad 1716 (FIG. 5) of monitor unit 1708. In step 2010 monitor unit 1708 continuously generates an RF sine wave during the polling period and watches for modulation to occur. If no motion data is returned during the polling period, control returns to step 2008 to wait for the user to press update button 224 again before repeating the process. Detected modulation in step 2012 indicates the presence of object unit 1700 transmitting spin, g-force data, and identification code. Monitor unit 1708 may employ anti-collision protocols for the case in which multiple object units within its transmission range respond simultaneously. If motion data is returned during the poll, control passes to step 2014. The description of steps 2014 through 2024 is the same as shown in FIG. 14 in corresponding steps 1404A through 1414A.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A measuring device comprising an object unit secured to a movable object, said object unit comprising:

an acceleration sensor network that detects at least one spin event of said movable object;

an electronic processor circuit connected to said acceleration sensor network;

a radio transmitter connected to said electronic processor circuit; and a monitor unit external to said object unit comprising
        a radio receiver wherein said object unit communicates with said monitor unit by sending from said radio transmitter at least one radio signal to said radio receiver,
        a monitor processor connected to said radio receiver, wherein said monitor processor determines motion characteristics of said movable object,
        an output display connected to said monitor processor, and
        an input keypad connected to said monitor processor;

wherein said at least one radio signal further comprises an identification code derived from said object unit, wherein said monitor unit will only process said at least one radio signal when said at least one radio signal is a first radio signal received by said monitor unit after said monitor unit has been primed, and further wherein all subsequent radio signals having said identification code from said object unit will also be processed by said monitor unit and any of said all subsequent radio signals having a different identification code from a plurality of other object units will not be processed by said monitor unit.

2. The measuring device of claim 1 wherein said monitor unit is primed by pressing a reset button on said input keypad.

3. A measuring device comprising:

an object unit secured to a movable object, said object unit comprising
        an acceleration sensor network comprising a first pair of mixed g-force sensors that detect at least one spin event of said movable object,
        an electronic processor circuit connected to said first pair of mixed g-force sensors, wherein said electronic processor receives an output of said first pair of mixed g-force sensors and determines motion characteristics of said movable object from said output, and
        an output display in communication with said electronic processor circuit for displaying said motion characteristics.

4. A measuring device according to claim 3 wherein said movable object is a sporting device.

5. A measuring device according to claim 3 wherein said motion characteristics determined include an elapsed time.

6. A measuring device according to claim 3 wherein said motion characteristics determined include a speed.

7. A measuring device according to claim 3 wherein said motion characteristics determined include a trajectory height.

8. A measuring device according to claim 3 wherein said motion characteristics determined include a spin rate.

9. A measuring device according to claim 3 wherein said motion characteristics determined include a curve.

10. A measuring device according to claim 3 wherein said object unit is attached within a hollow movable object.

11. A measuring device according to claim 3 wherein said first pair of mixed g-force sensors are located substantially diametrically opposed at a first predetermined distance apart along a first axis of said movable object and have a sensitivity to g-forces along said first axis, wherein said first axis runs through a center of said movable object, and further wherein a first of said first pair of mixed g-force sensors comprises a mechanical g-force sensor switch, and a second of said first pair of mixed g-force sensors comprises a g-force proportional output sensor.

12. A measuring device according to claim 11 wherein said acceleration sensor network further comprises:

a second pair of mixed g-force sensors located substantially diametrically opposed at a second predetermined distance apart along a second axis of said movable object, wherein said second axis runs through said center of said movable object, and said second pair of mixed g-force sensors have a sensitivity to g-forces normal to said first axis, and further wherein a first of said second pair of mixed g-force sensors comprises a mechanical g-force sensor switch, and a second of said second pair of mixed g-force sensors comprises a g-force proportional output sensor.

13. A measuring device according to claim 12 wherein said acceleration sensor network further comprises:

a third pair of mixed g-force sensors located substantially diametrically opposed at a third predetermined distance apart along a third axis, wherein said third axis runs through said center of said movable object and said third pair of mixed g-force sensors have a sensitivity to g-forces normal to a plane containing said first axis and said second axis, and further wherein a first of said third pair of mixed g-force sensors comprises a mechanical g-force sensor switch, and a second of said third pair of mixed g-force sensors comprises a g-force proportional output sensor.

14. A measuring device according to claim 13 wherein said movable device comprises a ball, and further wherein said first pair of g-force sensors are aligned to a surface feature of said ball, and still further wherein said electronic processor determines a spatial relationship between an axis of rotation of said spin to said surface feature.

15. A measuring device according to claim 14 wherein said electronic processor further determines a type of pitch of said ball.

16. A measuring device comprising:
an object unit secured to a movable object, said object unit comprising
an acceleration sensor network comprising a first pair of mixed g-force sensors that detect at least one spin event of said movable object,
an electronic processor circuit connected to said first pair of mixed g-force sensors, wherein said electronic processor processes an output of said first pair of mixed g-force sensors to create motion data, and
a radio transmitter connected to said electronic processor circuit, for transmitting at least one radio signal comprising said motion data; and
a monitor unit, wherein said monitor unit is located external to said object unit, wherein said monitor unit comprises a radio receiver for receiving said at least one radio signal from said radio transmitter,
a monitor processor connected to said radio receiver, wherein said monitor processor determines at least one motion characteristic of said movable object from said motion data received by said radio receiver, and
an output display for displaying said at least one motion characteristic.

17. A measuring device according to claim 16 wherein said movable object is a sporting device.

18. A measuring device according to claim 16 wherein said motion characteristics determined include an elapsed time.

19. A measuring device according to claim 16 wherein said motion characteristics determined include a speed.

20. A measuring device according to claim 16 wherein said motion characteristics determined include a trajectory height.

21. A measuring device according to claim 16 wherein said motion characteristics determined include a spin rate.

22. A measuring device according to claim 16 wherein said motion characteristics determined include a curve.

23. A measuring device according to claim 16 wherein said object unit is attached within a hollow movable object.

24. A measuring device according to claim 16 wherein said at least one radio signal persists for the duration of said at least one spin event.

25. A measuring device according to claim 16 wherein said radio transmitter sends to said radio receiver at least one radio signal having a datum indicating an elapsed time of said spin event.

26. A measuring device according to claim 16 wherein said radio transmitter sends to said radio receiver at least one radio signal having a datum indicating a centrifugal g-force.

27. A measuring device according to claim 16 wherein said at least one radio signal further comprises an identification code derived from said object unit, wherein said monitor unit will only process said at least one radio signal when said at least one radio signal is a first radio signal received by said monitor unit after said monitor unit has been primed, and further wherein all subsequent radio signals having said identification code from said object unit will also be processed by said monitor unit and any of said all subsequent radio signals having a different identification code from a plurality of other object units will not be processed by said monitor unit.

28. A measuring device comprising:
an object unit secured to a movable object, said object unit comprising
an acceleration sensor network comprising a first pair of mechanical g-force sensor switches and a first g-force proportional output sensor, wherein said first pair of mechanical g-force sensor switches comprise a mechanical g-force sensor switch network, wherein said mechanical g-force sensor switch network detects at least one spin event of said movable object,
an electronic processor circuit connected to said acceleration sensor network, wherein said electronic processor circuit receives an output of said acceleration sensor network and determines motion characteristics of said movable object from said output, and
an output display in communication with said electronic processor circuit for displaying said motion characteristics.

29. A measuring device according to claim 28 wherein said movable object is a sporting device.

30. A measuring device according to claim 28 wherein power to said first g-force proportional output sensor is not turned on until said mechanical g-force sensor switch network detects said at least one spin event of said movable object, and further wherein, after said first g-force proportional output sensor determines a g-force data, power is turned off to said first g-force proportional output sensor.

31. A measuring device according to claim 28 wherein said motion characteristics determined include a spin rate.

32. A measuring device according to claim 28 wherein said motion characteristics determined include a curve.

33. A measuring device comprising:
an object unit secured to a movable object, said object unit comprising
an acceleration sensor network comprising a first pair of mechanical g-force sensor switches and a first g-force proportional output sensor, wherein said first pair of mechanical g-force sensor switches comprise a mechanical g-force sensor switch network, wherein said mechanical g-force sensor switch network detects at least one spin event of said movable object,
an electronic processor circuit connected to said acceleration sensor network, wherein said electronic processor circuit processes an output of said acceleration sensor network to create motion data, and
a radio transmitter connected to said electronic processor circuit for transmitting at least one radio signal comprising said motion data; and
a monitor unit, wherein said monitor unit is located external to said object unit, wherein said monitor unit comprises a radio receiver for receiving said at least one radio signal from said radio transmitter,
a monitor processor connected to said radio receiver, wherein said monitor processor determines at least one motion characteristic of said movable object from said motion data received by said radio receiver, and
an output display for displaying said at least one motion characteristic.

34. A measuring device according to claim 33 wherein said first pair of mechanical g-force sensor switches are substantially diametrically opposed at a first predetermined distance apart along a first axis and have a sensitivity to g-forces along said first axis, wherein said first axis substantially runs through a center of said movable object, and said first g-force proportional output sensor lies along a second axis, wherein said second axis runs through said center of said movable object, and further wherein said first g-force proportional output sensor has a sensitivity to g-forces along said second axis.

35. A measuring device according to claim 34 wherein said acceleration sensor network further comprises a second g-force proportional output sensor which lies along a third axis, wherein said third axis runs through said center of said movable object, and said second g-force proportional output sensor has a sensitivity to g-forces normal to said second axis.

36. A measuring device according to claim 35 wherein said acceleration sensor network further comprises a third g-force proportional output sensor which lies along a fourth axis, wherein said fourth axis runs through said center of said movable object, and said third g-force proportional output sensor has a sensitivity to g-forces normal to a plane containing said second axis and said fifth axis.

37. A measuring device according to claim 36 wherein said movable device comprises a ball, and further wherein said first pair of g-force sensors are aligned to a surface feature of said ball, and still further wherein said electronic processor determines a spatial relationship between an axis of rotation of said spin to said surface feature.

38. A measuring device according to claim 33 wherein said motion characteristics determined include a spin rate.

39. A measuring device according to claim 33 wherein said motion characteristics determined include a curve.

40. A measuring device according to claim 33 wherein said electronic processor further determines a type of pitch of said ball.

41. A measuring device according to claim 33 wherein said radio transmitter sends to said radio receiver at least one radio signal having a datum indicating a centrifugal g-force.

42. A measuring device according to claim 33 wherein said movable object is a sporting device.

43. A measuring device according to claim 33 wherein power to said first g-force proportional output sensor is not turned on until said mechanical g-force sensor switch network detects said at least one spin event of said movable object, and further wherein, after said first g-force proportional output sensor determines a g-force data, power is turned off to said first g-force proportional output sensor.

44. A measuring device according to claim 33 wherein said object unit is attached within a hollow movable object.

45. A measuring device according to claim 33 wherein said at least one radio signal further comprises an identification code derived from said object unit, wherein said monitor unit will only process said at least one radio signal when said at least one radio signal is a first radio signal received by said monitor unit after said monitor unit has been primed, and further wherein all subsequent radio signals having said identification code from said object unit will also be processed by said monitor unit and any of said all subsequent radio signals having a different identification code from a plurality of other object units will not be processed by said monitor unit.

46. A method for measuring characteristics of a movable object comprising the steps of:

(a) detecting a start of a spin event of said movable object with a mechanical g-force sensor switch network secured to said movable object;

(b) capturing g-force data with said at least one g-force proportional output sensor; and (c) calculating a spin rate of said movable object from said g-force data.

47. A method for measuring a movable object according to claim 46 further comprising the step (d):

(d) repeating steps (a) through (c) for a next spin event of said movable object.

48. A method for measuring a movable object according to claim 46 wherein step (c) further comprises the following step (c1):

(c1) calculating a curve of said movable object from said spin rate calculated in step (c).

49. A method for measuring a movable object according to claim 46 wherein said mechanical g-force sensor switch network and said at least one g-force proportional output sensor comprise an acceleration sensor network, wherein said acceleration sensor network is located within an object unit, and further wherein said object unit is secured to said movable object, and still further wherein step (b) further comprises the following steps (b1) and (b2), and further comprising the following new step (d):

(b1) transmitting, from said movable object to said monitor unit, a radio signal having a datum indicating said g-force data;

(b2) receiving said transmitted radio signal modulated with said g-force data datum in a radio receiver located in a monitor unit; and (d) displaying said spin rate of said movable object on an output display connected to a monitor processor within said monitor unit.

50. A method for measuring a movable object according to claim 49 wherein said radio signal further comprises an identification code derived from said object unit, wherein said monitor unit will only process said at least one radio signal when said at least one radio signal is a first radio signal received by said monitor unit after said monitor unit has been primed, and further wherein all subsequent radio signals having said identification code from said object unit will also be processed by said monitor unit and any of said all subsequent radio signals having a different identification code from a plurality of other object units will not be processed by said monitor unit.

51. A method for measuring a movable object according to claim 46 wherein step (b) further comprises the step (b0) performed before step (b) and step (b1) performed after step (b):

(b0) turning power on to said at least one g-force proportional output sensor within said movable object; and (b1) turning power off to said at least one g-force proportional output sensor within said movable object.

52. A method for measuring characteristics of a movable object according to claim 46 wherein said movable device comprises a ball, and further wherein a predetermined pair of said g-force sensors are aligned to a surface feature of said ball, further comprising the step of determining a spatial relationship between an axis of rotation of said spin to said surface feature.

53. A method for measuring characteristics of a movable object according to claim 52 further comprising the step of determining a type of pitch of said ball.

54. A method for measuring characteristics of a movable object comprising the steps of:

(a) detecting a start of a spin event of said movable object with an acceleration sensor network secured to said movable object, wherein said acceleration sensor network is comprised of a pair of mixed g-force sensors;

(b) capturing g-force data with said acceleration sensor network; and (c) calculating a spin rate of said movable object from said g-force data.

55. A method for measuring characteristics of a movable object according to claim 54 further comprising the step (d):

(d) repeating steps (a) through (c) for a next spin event of said movable object.

56. A method for measuring characteristics of a movable object according to claim 54 wherein step (a) further comprises the following step (a1), and step (c) further comprises the following steps (c1) and (c2):

(a1) determining a first time for said start of said spin event;

(c1) detecting a stop of said spin event; and (c2) determining a second time for said stop of said spin event.

57. A method for measuring characteristics of a movable object according to claim 56 wherein step (a) further comprises the following step (a0) performed before step (a), step (c2) further comprises the following step (c2a), and step (d) is performed after step (c):

(a0) receiving a distance between two points wherein motion characteristics of said movable object moving between said two points are desired to be measured;

(c2a) subtracting said first time from said second time to determine an elapsed time for said spin event; and (d) calculating a speed of said movable object by dividing said distance by said elapsed time.

58. A method for measuring characteristics of a movable object according to claim 54 wherein said acceleration sensor network is located within an object unit secured to said movable object, and further wherein step (b) further comprises the following steps (b1) and (b2), and further comprising the following new step (d):

(b1) transmitting, from said movable object to said monitor unit, a radio signal modulated with a datum indicating said g-force data;

(b2) receiving said transmitted radio signal modulated with said g-force data datum in a radio receiver located in said monitor unit; and (d) displaying said spin rate of said movable object on an output display connected to said monitor processor within said monitor unit.

59. A method for measuring characteristics of a movable object according to claim 58 wherein said radio signal further comprises an identification code derived from said object unit, wherein said monitor unit will only process said at least one radio signal when said at least one radio signal is a first radio signal received by said monitor unit after said monitor unit has been primed, and further wherein all subsequent radio signals having said identification code from said object unit will also be processed by said monitor unit and any of said all subsequent radio signals having a different identification code from a plurality of other object units will not be processed by said monitor unit.

60. A method for measuring a movable object according to claim 54 further comprises the following step (d):

(d) calculating a curve of said movable object from said spin rate calculated in step (c).

61. A method for measuring characteristics of a movable object according to claim 54 wherein said movable device comprises a ball, and further wherein a predetermined pair of said g-force sensors are aligned to a surface feature of said ball, further comprising the step of determining a spatial relationship between an axis of rotation of said spin to said surface feature.

62. A method for measuring characteristics of a movable object according to claim 61 further comprising the step of determining a type of pitch of said ball.

63. A measuring device comprising:

an object unit secured to a movable object, said object unit comprising an acceleration sensor network comprising an aligned pair of g-force sensors that detect at least one spin event of said movable object, an electronic processor circuit connected to said aligned pair of g-force sensors, wherein said electronic processor receives an output of said aligned pair of g-force sensors and determines motion characteristics of said movable object from said output, and an output display in communication with said electronic processor circuit for displaying said motion characteristics.

64. A measuring device according to claim 63 wherein said movable object is a sporting device.

* * * * *